US012113853B2

(12) United States Patent
Guim Bernat et al.

(10) Patent No.: US 12,113,853 B2
(45) Date of Patent: Oct. 8, 2024

(54) METHODS AND APPARATUS TO MANAGE QUALITY OF SERVICE WITH RESPECT TO SERVICE LEVEL AGREEMENTS IN A COMPUTING DEVICE

(71) Applicant: Intel Corporation, Santa Clara, CA (US)

(72) Inventors: Francesc Guim Bernat, Barcelona (ES); Andrew J. Herdrich, Hillsboro, OR (US); Kshitij Arun Doshi, Tempe, AZ (US); Monica Kenguva, Phoenix, AZ (US); Ned M. Smith, Beaverton, OR (US); Nilesh Jain, Portland, OR (US); Brinda Ganesh, Portland, OR (US); Rashmin Patel, Chandler, AZ (US); Alexander Vul, San Jose, CA (US)

(73) Assignee: INTEL CORPORATION, Santa Clara, CA (US)

( * ) Notice: Subject to any disclaimer, the term of this patent is extended or adjusted under 35 U.S.C. 154(b) by 867 days.

(21) Appl. No.: 17/033,370

(22) Filed: Sep. 25, 2020

(65) Prior Publication Data

US 2021/0014303 A1  Jan. 14, 2021

(51) Int. Cl.
*H04L 67/1012* (2022.01)
*H04L 41/5009* (2022.01)
(Continued)

(52) U.S. Cl.
CPC ...... *H04L 67/1012* (2013.01); *H04L 41/5009* (2013.01); *H04L 41/5019* (2013.01); *H04L 67/01* (2022.05); *H04L 67/1089* (2013.01)

(58) Field of Classification Search
CPC ............ H04L 41/5009; H04L 67/1012; H04L 67/562; H04L 67/1089
(Continued)

(56) References Cited

U.S. PATENT DOCUMENTS 11,080,096 B1 * 8/2021 Fakhouri ............... G06F 9/5072

OTHER PUBLICATIONS

Software.intel.com, "Intel 64 and IA-32 Architectures Software Developer Manuals," published Oct. 12, 2016, last updated Sep. 14, 2020, 13 pages. <https://software.intel.com/content/www/us/en/develop/articles/intel-sdm.html>.
(Continued)

*Primary Examiner* — Lan Dai T Truong
(74) *Attorney, Agent, or Firm* — HANLEY, FLIGHT & ZIMMERMAN, LLC

(57) ABSTRACT

Example methods, apparatus, and systems to manage quality of service with respect to service level agreements in a computing device are disclosed. An example apparatus includes a first mesh proxy assigned to a first platform-agnostic application, the first mesh proxy to generate a first resource request signal based on a first service level agreement requirement from the first platform-agnostic application; a second mesh proxy assigned to a second platform-agnostic application, the second mesh proxy to generate a second resource request signal based on a second service level agreement requirement from second platform-agnostic application; and a load balancer to allocate hardware resources for the first platform-agnostic application and the second platform-agnostic application based on the first resource request signal and the second resource request signal.

21 Claims, 18 Drawing Sheets

(51) Int. Cl.
*H04L 41/5019* (2022.01)
*H04L 67/01* (2022.01)
*H04L 67/1087* (2022.01)

(58) Field of Classification Search
USPC .......................................................... 709/203
See application file for complete search history.

(56) References Cited

OTHER PUBLICATIONS

Khang T Nguyen, "Software Enabling for Cache Allocation Technology in the Intel Xeon Processor E5 v4 Family," Intel Development Topics & Technologies, published Feb. 11, 2016, 2 pages. <https://software.intel.com/content/www/us/en/develop/articles/software-enabling-for-cache-allocation-technology.html>.

Intel Open Source.org, "Cache Monitoring Technology," 5 pages, Aug. 22, 2019. <https://01.org/cache-monitoring-technology>.

Khang T Nguyen, "Intel's Cache Monitoring Technology Software-Visible Interfaces," Intel Development Topics & Technologies, published Dec. 12, 2014, 8 pages. <https://software.intel.com/content/www/us/en/develop/blogs/intel-s-cache-monitoring-technology-software-visible-interfaces.html>.

Khang T Nguyen, "Introduction to Cache Allocation Technology in the Intel Xeon Processor E5 v4 Family," Intel Development Topics & Technologies, published Feb. 11, 2016, 8 pages. <https://software.intel.com/content/www/us/en/develop/articles/introduction-to-cache-allocation-technology.html>.

* cited by examiner

METHODS AND APPARATUS TO MANAGE QUALITY OF SERVICE WITH RESPECT TO SERVICE LEVEL AGREEMENTS IN A COMPUTING DEVICE

BRIEF DESCRIPTION

When an application (e.g., third party software) is installed on a computing device, the operating system of the computing device manages hardware resources of the computing device to provide services for the application. Some applications include service level agreements (SLAs) or service level objectives (SLOs) that define requirements for performance metrics associated with the application. Such performance metrics may correspond to memory/cache bandwidth, central processing unit (CPU) usage, jitter, latency, speed, a number/percentage of packet drops, a number of frames per second to process, etc. The SLA and/or SLO requirements inform the computing device of the minimum requirements needed to implement the application.

BRIEF DESCRIPTION OF THE DRAWINGS

The figures are not to scale. In general, the same reference numbers will be used throughout the drawing(s) and accompanying written description to refer to the same or like parts.

Figure 1:
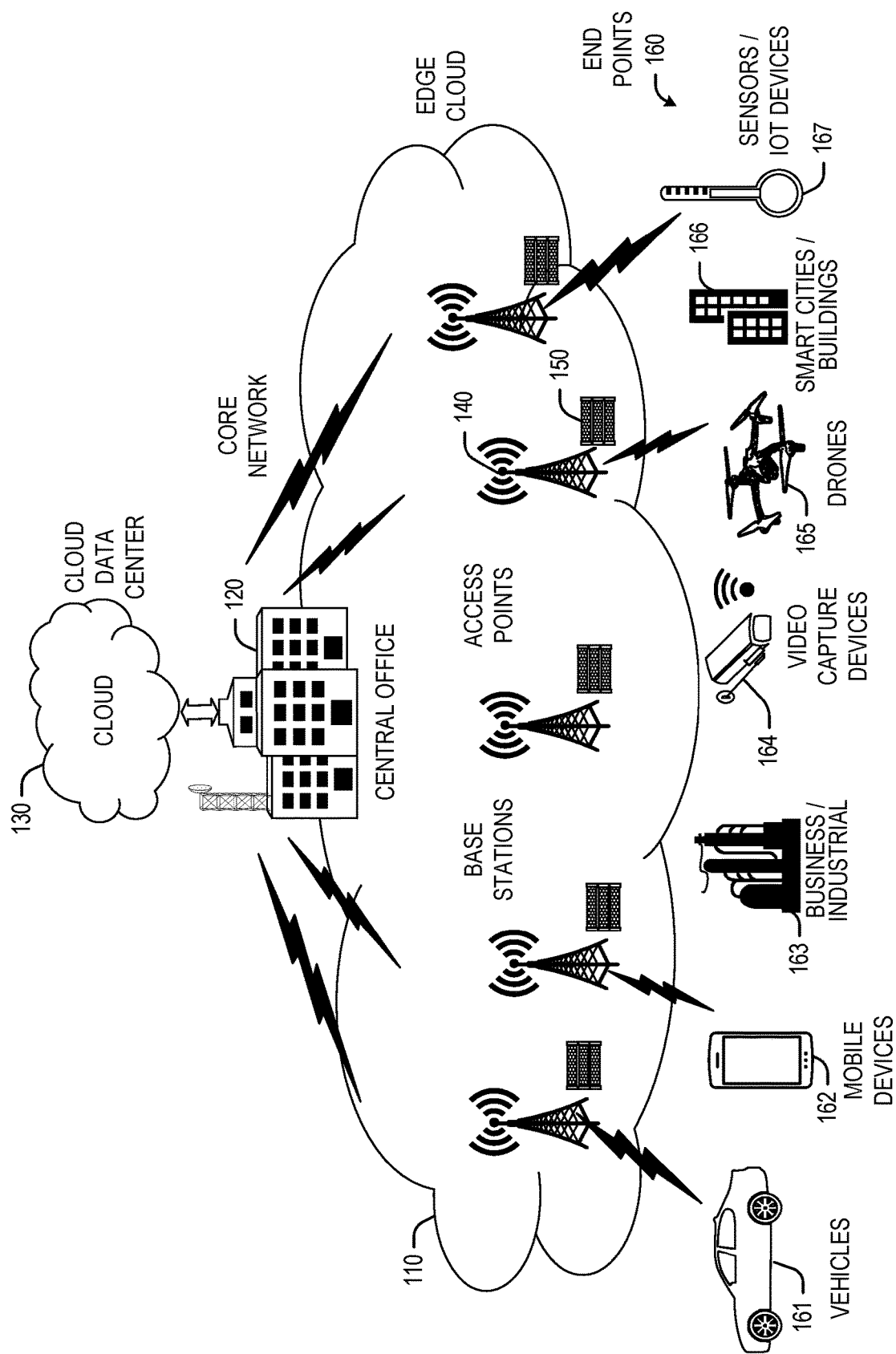
FIG. 1 illustrates an overview of an edge cloud configuration for edge computing.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components

DETAILED DESCRIPTION

Flexibility and easily manageable rack level solutions are desirable for network edge processing and/or virtual machine processing, where multiple edge domains share a pool of resources. For example, if a process is memory intensive and/or processor intensive, it may be advantageous to split the process into sub processes that can be executed by different computing devices to ensure efficiency, speed, and/or accuracy. Each of these computing devices may have a set of resources that may be shared with other connected devices. As used herein, pooled resources are resources (e.g., memory, CPU, GPU, accelerators, etc.) of a first device, a single Edge node device, and/or first virtual machine that allocates or ear-marks resources for a particular tenant/user. Pooled resources can be shared with and/or used by another device to perform a particular task. In this manner, an application can utilize the resources of multiple computing device and/or virtual machines to perform a task in a fast and efficient manner. In some examples, the application includes service level agreement (SLA) requirements and/or service level objectives (SLO) requirements for performing the task. For example, an SLA/SLO requirement(s) of a service request from an application may correspond to bandwidth requirements, latency requirements, jitter requirements, number/percentage of packet drops, number of images processed per second, etc.

Some cloud-based developments simplify the complexities and details of an underlying platform from applications that interface with the platform. In this manner, such simplifications reduce the need for some solutions to have to be cognizant of platform capabilities or locations of infrastructural services, thereby increasing solution velocity. However, such cloud-based developments hide some or all of the software (e.g., operating system (OS)) and/or virtual machine manager (VMM) platform capabilities and/or hardware characteristics (e.g., CPU, GPU, memory, etc.) of a computing device from an application that attempts to use pooled resources to perform a task. Thus, such cloud-based development makes it difficult for an application to split a process among multiple different computing devices and/or virtual machines as the characteristics of the hardware and/or software may be hidden, thereby making it difficult and/or impossible to ensure SLA/SLO requirements corresponding to the task will be satisfied since the software and/or hardware characteristics are hidden.

Examples disclosed herein manage quality of service (QoS) functionality by facilitating compliance with SLA/SLO requirements for pooled resources of computing devices. Examples disclosed herein include a broker to receive service requests from external applications (e.g., operating in another computing device, a cloud/data center, an edge based server, a central database, etc.) and forward the service requests to a QoS controller implemented in the computing device that includes the pooled resources. The QoS controller is enforced by resource director technology (RDT). RDT includes cache monitoring, cache allocation, memory bandwidth monitoring, and memory bandwidth allocation. Additionally, RDT can interface with a device interconnect fabric (e.g., a peripheral component interconnect express (PCIe)) switch in device interconnect fabric-based network devices to monitor bandwidth by various device interconnect fabric (e.g., PCIe) connected components (e.g., accelerators, network interface cards, storage, etc.). For example, the switch may support a total of 64 gigabits (Gb)/second (s), and if the switch is connected to three PCIe devices (e.g., each device with the ability to use up to 40 Gb/s), the RDT may be used to define and enforce a limit on the use of the 64 Gb/s bandwidth according to various minimum bandwidths configured for the respective three devices. PCIe and other bus protocols may include commands related to the ability of a service to allocate, assign, earmark, and/or otherwise pool resources for use by a particular tenant, user, workload, etc. By monitoring the use of the commands, examples disclosed herein can monitor (e.g., build a map of) user/available resource at any time. In this manner, the QoS controller can determine whether the pooled resources of the computing device are capable of serving the request based on the SLA/SLO requirements. For example, if a service request corresponds to a particular memory bandwidth, the QoS controller can determine whether the computing device is capable of achieving the memory bandwidth and then submit a response to the broker based on the determination. After the broker obtains responses from all the connected computing devices with pooled resources, the broker can determine how to allocate the process to the computing devices to service the request according to the SLA/SLO requirements.

Additionally, examples disclosed herein leverage one or more mesh proxies within a computing device to reduce the size and complexity of applications being developed for computing devices and/or transmitted to computing devices. Applications are developed to be implemented in a computing device to cause the computing device to perform one or more tasks according to instructions included in the applications. However, there are multiple versions of computing devices with different hardware components, different operating systems, and/or different VMMs. Accordingly, applications include a service level agreement (SLA) and/or service level objectives (SLO) library that identifies how to operate and/or communicate with different types of computing devices. Additionally or alternatively, the application may include a SLA or SLO launcher and/or administrator to handle the communication with the different computing device types. For example, the SLO/SLA library/launcher/administrator can convert a SLA/SLO into resource-based attributes and generate a RDT control signal (e.g., a resource request signal) based on the resource-based attributes. As described above, a SLA/SLO identifies requirements (e.g., bandwidth requirements, latency requirements, jitter requirements, number of packet drops, etc.) of an application when implemented by a computing system. The RDT control signal corresponds to instructions to reserve the appropriate amount of memory and/or processor resources to satisfy the SLA/SLO requirements. In this manner, an application can enforce a SLA and/or SLO while utilizing resources to execute a task on multiple types of computing devices. However, the SLA libraries and/or SLA launcher/administrator require a lot of code. Accordingly, transmitting the application to a device corresponds to a large amount of data even when the application is just a couple of lines of code.

Mesh proxies are components implemented in containers (e.g., sidecars) that implement a common set of functionalities needed for directory lookups to locate other services on the same or a different machine. A mesh proxy operates as a communication bridge to other mesh-proxies in other containers and implements common infrastructure services such as transport, secure transport, a connection to host bridges, load-balancing, protocol bridging, etc. The mesh proxy is implemented in the computing device and is in communication with the operating system of the computing device. In this manner, applications can be platform-agnostic (e.g., without including code corresponding to a particular operating system and/or particular hardware resources of the device/platform that the application is implemented in). Thus, the applications can run on a device and remain agnostic of the operating system and/or hardware of the underlying computing device as well as other connected computing devices because the mesh proxy operates as the bridge between the application and the operating system of the device and other devices.

Examples disclosed herein leverage mesh proxies to eliminate the inclusion of SLA/SLO libraries, launchers, and/or administrators from applications. Because the mesh proxy is implemented in the computing device, when a new application is implemented in the computing device, the computing device assigns a mesh proxy to the new application and the mesh proxy converts the high-level SLA/SLO requirements to resource-based attributes for RDT control instructions. In this manner, the application does not need to include the SLA libraries and/or launchers. Thus, applications can run on any type of computing device without including code (e.g., SLA/SLO libraries, launchers, and/or administrators) specific to the different computing device types. Accordingly, the size of applications being transmitted via a network is decreased in size, leading to more efficient and faster application transmission with less complex code development.

FIG. 1 is a block diagram 100 showing an overview of a configuration for edge computing, which includes a layer of processing referred to in many of the following examples as an "edge cloud". As shown, the edge cloud 110 is co-located at an edge location, such as an access point or base station 140, a local processing hub 150, or a central office 120, and thus may include multiple entities, devices, and equipment instances. The edge cloud 110 is located much closer to the endpoint (consumer and producer) data sources 160 (e.g., autonomous vehicles 161, user equipment 162, business and industrial equipment 163, video capture devices 164, drones 165, smart cities and building devices 166, sensors and IoT devices 167, etc.) than the cloud data center 130. Compute, memory, and storage resources which are offered at the edges in the edge cloud 110 are critical to providing ultra-low latency response times for services and functions used by the endpoint data sources 160 as well as reduce network backhaul traffic from the edge cloud 110 toward cloud data center 130 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 2:
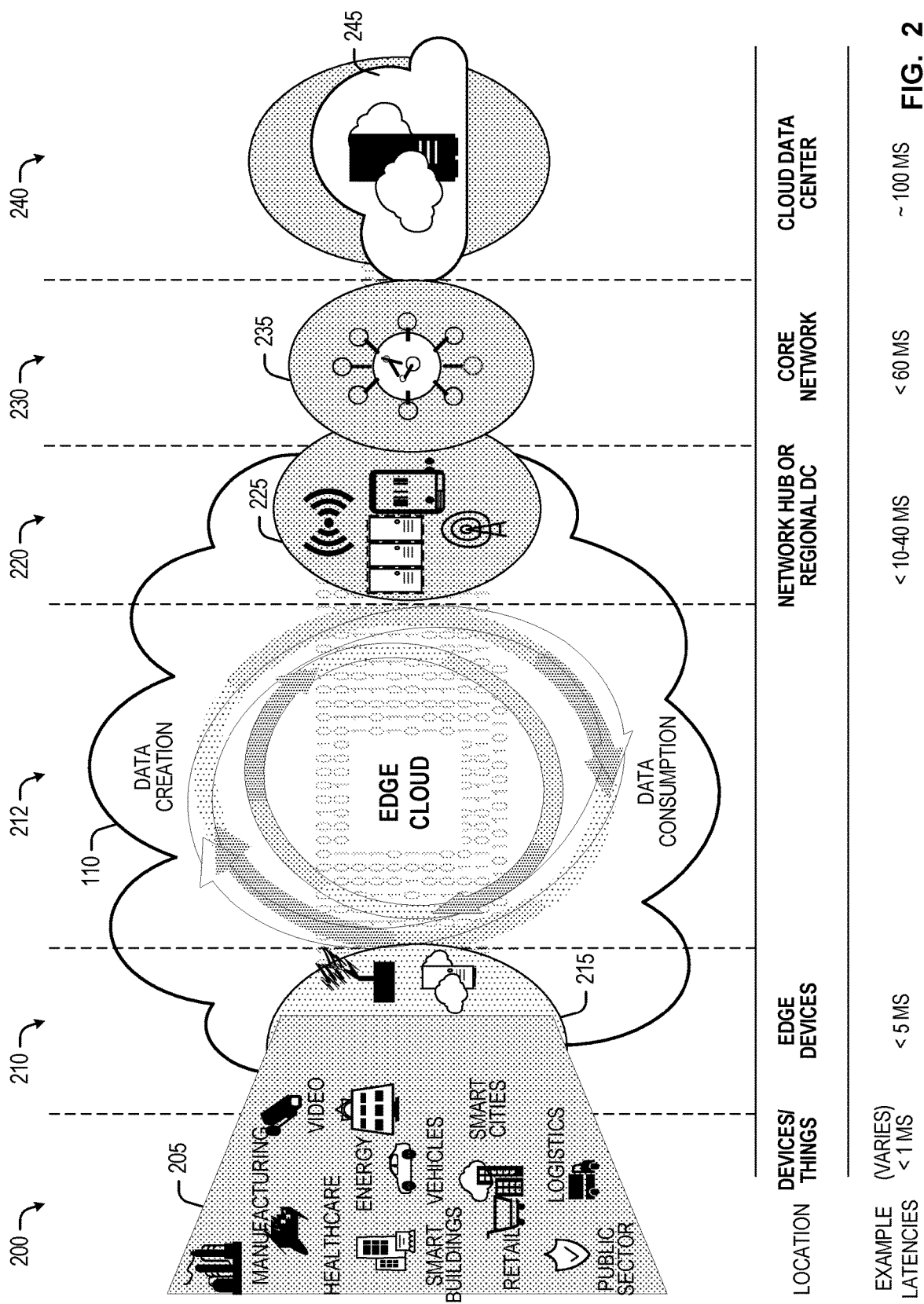
FIG. 2 illustrates operational layers among endpoints, an edge cloud, and cloud computing environments.

FIG. 2 illustrates operational layers among endpoints, an edge cloud, and cloud computing environments. Specifically, FIG. 2 depicts examples of computational use cases 205, utilizing the edge cloud 110 among multiple illustrative layers of network computing. The layers begin at an endpoint (devices and things) layer 200, which accesses the edge cloud 110 to conduct data creation, analysis, and data consumption activities. The edge cloud 110 may span multiple network layers, such as an edge devices layer 210 having gateways, on-premise servers, or network equipment (nodes 215) located in physically proximate edge systems; a network access layer 220, encompassing base stations, radio processing units, network hubs, regional data centers (DC), or local network equipment (equipment 225); and any equipment, devices, or nodes located therebetween (in layer 212, not illustrated in detail). The network communications within the edge cloud 110 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 200, under 5 ms at the edge devices layer 210, to even between 10 to 40 ms when communicating with nodes at the network access layer 220. Beyond the edge cloud 110 are core network 230 and cloud data center 240 layers, each with increasing latency (e.g., between 50-60 ms at the core network layer 230, to 100 or more ms at the cloud data center layer). As a result, operations at a core network data center 235 or a cloud data center 245, with latencies of at least 50 to 100 ms or more, will not be able to accomplish many time-critical functions of the use cases 205. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 235 or a cloud data center 245, a central office or content data network may be considered as being located within a "near edge" layer ("near" to the cloud, having high latency values when communicating with the devices and endpoints of the use cases 205), whereas an access point, base station, on-premise server, or network gateway may be considered as located within a "far edge" layer ("far" from the cloud, having low latency values when communicating with the devices and endpoints of the use cases 205). It will be understood that other categorizations of a particular network layer as constituting a "close", "local", "near", "middle", or "far" edge may be based on latency, distance, number of network hops, or other measurable characteristics, as measured from a source in any of the network layers 200-240.

The various use cases 205 may access resources under usage pressure from incoming streams, due to multiple services utilizing the edge cloud. To achieve results with low latency, the services executed within the edge cloud 110 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 110 may provide the ability to serve and respond to multiple applications of the use cases 205 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 110 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 110 (network layers 200-240), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 110.

As such, the edge cloud 110 is formed from network components and functional features operated by and within edge gateway nodes, edge aggregation nodes, or other edge compute nodes among network layers 210-230. The edge cloud 110 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 110 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 110 may be servers, multi-tenant servers, appliance computing devices, and/or any other type of computing devices. For example, the edge cloud 110 may include an appliance computing device that is a self-contained electronic system including a housing, a chassis, a case or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 14B. The edge cloud 110 may also include one or more servers and/or one or more multi-tenant servers. Such a server may include an operating system and a virtual computing environment. A virtual computing environment may include a hypervisor manager (spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figure 3:
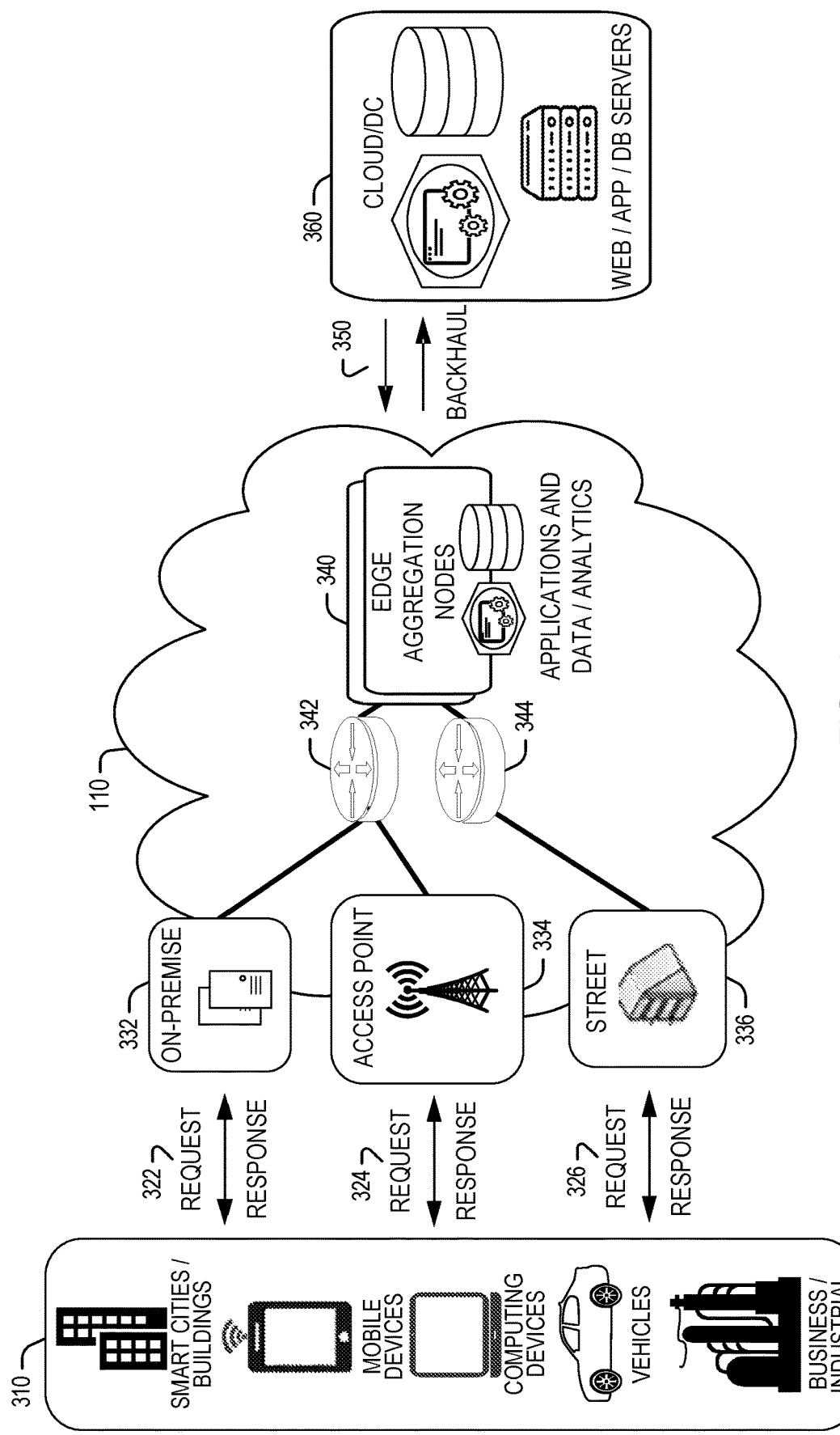
FIG. 3 illustrates a block diagram of an example environment for networking and services in an edge computing system.

FIG. 3 illustrates a block diagram of an example environment 300 in which various client endpoints 310 (in the form of mobile devices, computers, autonomous vehicles, business computing equipment, industrial processing equipment) exchange requests and responses with the example edge cloud 110. For instance, client endpoints 310 may obtain network access via a wired broadband network, by exchanging requests and responses 322 through an on-premise network system 332. Some client endpoints 310, such as mobile computing devices, may obtain network access via a wireless broadband network, by exchanging requests and responses 324 through an access point (e.g., cellular network tower) 334. Some client endpoints 310, such as autonomous vehicles may obtain network access for requests and responses 326 via a wireless vehicular network through a street-located network system 336. However, regardless of the type of network access, the TSP may deploy aggregation points 342, 344 within the edge cloud 110 to aggregate traffic and requests. Thus, within the edge cloud 110, the TSP may deploy various compute and storage resources, such as at edge aggregation nodes 340, to provide requested content. The edge aggregation nodes 340 and other systems of the edge cloud 110 are connected to a cloud or data center 360, which uses a backhaul network 350 to fulfill higher-latency requests from a cloud/data center for websites, applications, database servers, etc. Additional or consolidated instances of the edge aggregation nodes 340 and the aggregation points 342, 344, including those deployed on a single server framework, may also be present within the edge cloud 110 or other areas of the TSP infrastructure.

Figure 4:
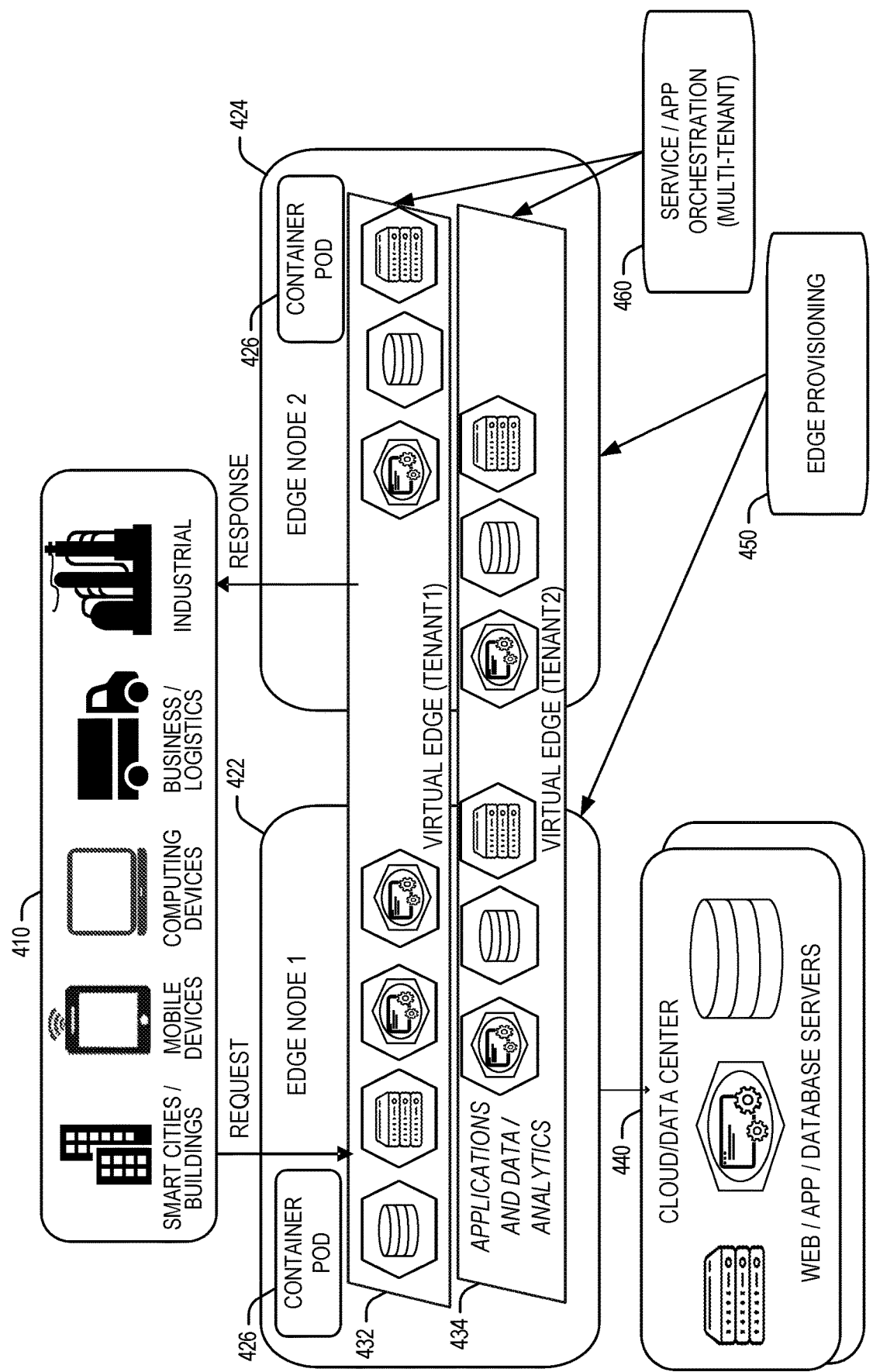
FIG. 4 illustrates deployment of a virtual edge configuration in an edge computing system operated among multiple edge nodes and multiple tenants.

FIG. 4 illustrates deployment and orchestration for virtual edge configurations across an edge computing system operated among multiple edge nodes and multiple tenants. Specifically, FIG. 4 depicts coordination of a first edge node 422 and a second edge node 424 in an edge computing system 400, to fulfill requests and responses for various client endpoints 410 (e.g., smart cities/building systems, mobile devices, computing devices, business/logistics systems, industrial systems, etc.), which access various virtual edge instances. Here, the virtual edge instances 432, 434 provide edge compute capabilities and processing in an edge cloud, with access to a cloud/data center 440 for higher-latency requests for websites, applications, database servers, etc. However, the edge cloud enables coordination of processing among multiple edge nodes for multiple tenants or entities.

In the example of FIG. 4, these virtual edge instances include: a first virtual edge 432, offered to a first tenant (Tenant 1), which offers a first combination of edge storage, computing, and services; and a second virtual edge 434, offering a second combination of edge storage, computing, and services. The virtual edge instances 432, 434 are distributed among the edge nodes 422, 424, and may include scenarios in which a request and response are fulfilled from the same or different edge nodes. The configuration of the edge nodes 422, 424 to operate in a distributed yet coordinated fashion occurs based on edge provisioning functions 450. The functionality of the edge nodes 422, 424 to provide coordinated operation for applications and services, among multiple tenants, occurs based on orchestration functions 460.

It should be understood that some of the devices 410 are multi-tenant devices where Tenant 1 may function within a tenant1 'slice' while a Tenant 2 may function within a tenant2 'slice' (and, in further examples, additional or sub-tenants may exist; and each tenant may even be specifically entitled and transactionally tied to a specific set of features all the way day to specific hardware features). A trusted multi-tenant device may further contain a tenant-specific cryptographic key such that the combination of key and slice may be considered a "root of trust" (RoT) or tenant specific RoT. A RoT may further be computed dynamically composed using a DICE (Device Identity Composition Engine) architecture such that a single DICE hardware building block may be used to construct layered trusted computing base contexts for layering of device capabilities (such as a Field Programmable Gate Array (FPGA)). The RoT may further be used for a trusted computing context to enable a "fan-out" that is useful for supporting multi-tenancy. Within a multi-tenant environment, the respective edge nodes 422, 424 may operate as security feature enforcement points for local resources allocated to multiple tenants per node. Additionally, tenant runtime and application execution (e.g., in instances 432, 434) may serve as an enforcement point for a security feature that creates a virtual edge abstraction of resources spanning potentially multiple physical hosting platforms. Finally, the orchestration functions 460 at an orchestration entity may operate as a security feature enforcement point for marshalling resources along tenant boundaries.

Edge computing nodes may partition resources (memory, central processing unit (CPU), graphics processing unit (GPU), interrupt controller, input/output (I/O) controller, memory controller, bus controller, etc.) where respective partitionings may contain a RoT capability and where fan-out and layering according to a DICE model may further be applied to Edge Nodes. Cloud computing nodes consisting of containers, FaaS engines, Servlets, servers, or other computation abstraction may be partitioned according to a DICE layering and fan-out structure to support a RoT context for each. Accordingly, the respective devices 410, 422, and 440 spanning RoTs may coordinate the establishment of a distributed trusted computing base (DTCB) such that a tenant-specific virtual trusted secure channel linking all elements end to end can be established.

Further, it will be understood that a container may have data or workload specific keys protecting its content from a previous edge node. As part of migration of a container, a pod controller at a source edge node may obtain a migration key from a target edge node pod controller where the migration key is used to wrap the container-specific keys. When the container/pod is migrated to the target edge node, the unwrapping key is exposed to the pod controller that then decrypts the wrapped keys. The keys may now be used to perform operations on container specific data. The migration functions may be gated by properly attested edge nodes and pod managers (as described above).

In further examples, an edge computing system is extended to provide for orchestration of multiple applications through the use of containers (a contained, deployable unit of software that provides code and needed dependencies) in a multi-owner, multi-tenant environment. A multi-tenant orchestrator may be used to perform key management, trust anchor management, and other security functions related to the provisioning and lifecycle of the trusted 'slice' concept in FIG. 4. For instance, an edge computing system may be configured to fulfill requests and responses for various client endpoints from multiple virtual edge instances (and, from a cloud or remote data center). The use of these virtual edge instances may support multiple tenants and multiple applications (e.g., augmented reality (AR)/virtual reality (VR), enterprise applications, content delivery, gaming, compute offload) simultaneously. Further, there may be multiple types of applications within the virtual edge instances (e.g., normal applications; latency sensitive applications; latency-critical applications; user plane applications; networking applications; etc.). The virtual edge instances may also be spanned across systems of multiple owners at different geographic locations (or, respective computing systems and resources which are co-owned or co-managed by multiple owners).

For instance, each of the edge nodes 422, 424 may implement the use of containers, such as with the use of a container "pod" 426, 428 providing a group of one or more containers. In a setting that uses one or more container pods, a pod controller or orchestrator is responsible for local control and orchestration of the containers in the pod. Various edge node resources (e.g., storage, compute, services, depicted with hexagons) provided for the respective edge slices 432, 434 are partitioned according to the needs of each container.

With the use of container pods, a pod controller oversees the partitioning and allocation of containers and resources. The pod controller receives instructions from an orchestrator (e.g., the orchestrator 460) that instructs the controller on how best to partition physical resources and for what duration, such as by receiving key performance indicator (KPI) targets based on SLA contracts. The pod controller determines which container requires which resources and for how long in order to complete the workload and satisfy the SLA. The pod controller also manages container lifecycle operations such as: creating the container, provisioning it with resources and applications, coordinating intermediate results between multiple containers working on a distributed application together, dismantling containers when workload completes, and the like. Additionally, a pod controller may serve a security role that prevents assignment of resources until the right tenant authenticates or prevents provisioning of data or a workload to a container until an attestation result is satisfied.

Also, with the use of container pods, tenant boundaries can still exist but in the context of each pod of containers. If each tenant specific pod has a tenant specific pod controller, there will be a shared pod controller that consolidates resource allocation requests to avoid typical resource starvation situations. Further controls may be provided to ensure attestation and trustworthiness of the pod and pod controller. For instance, the orchestrator 460 may provision an attestation verification policy to local pod controllers that perform attestation verification. If an attestation satisfies a policy for a first tenant pod controller but not a second tenant pod controller, then the second pod could be migrated to a different edge node that does satisfy it. Alternatively, the first pod may be allowed to execute and a different shared pod controller is installed and invoked prior to the second pod executing.

Figure 5:
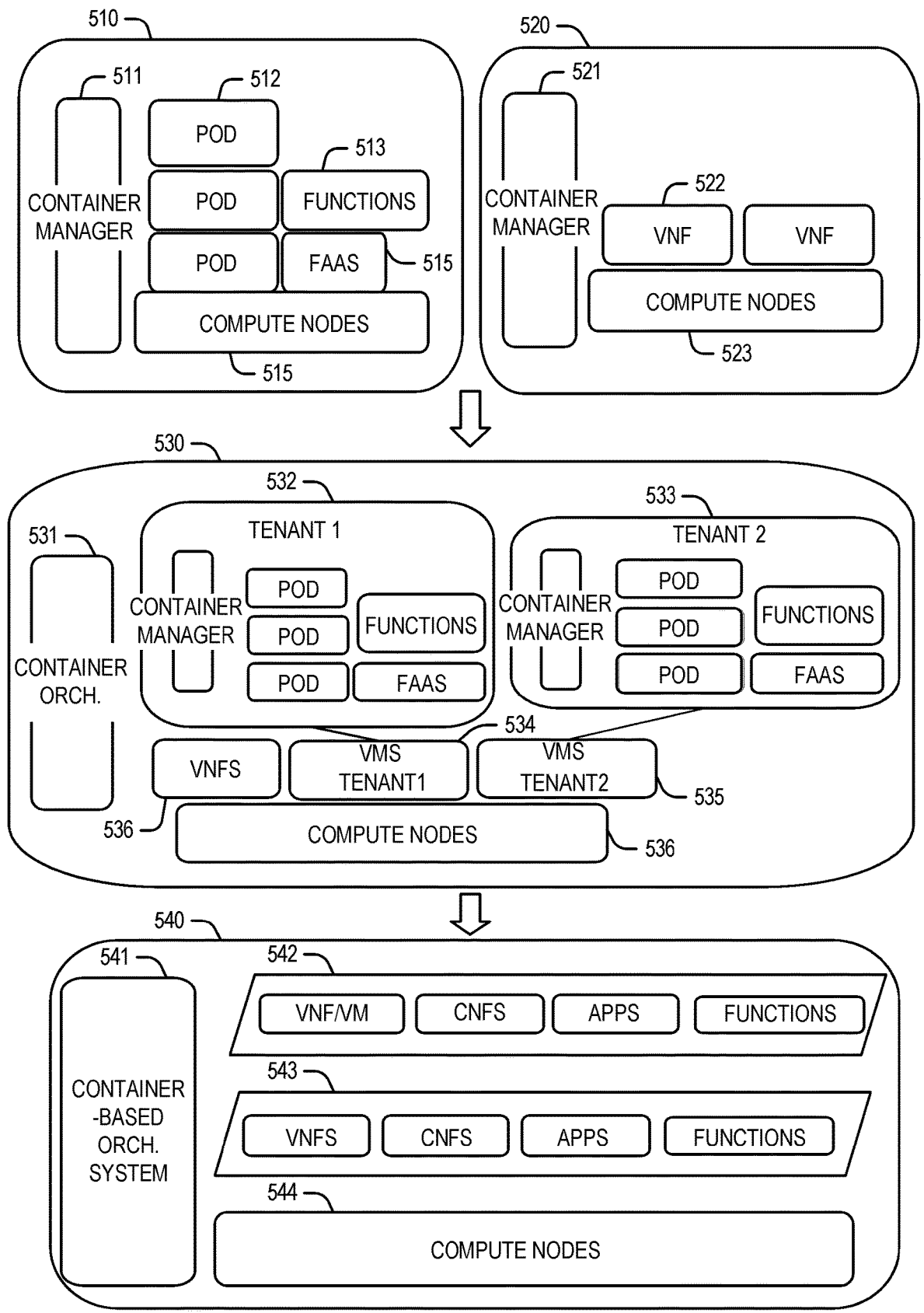
FIG. 5 illustrates various compute arrangements deploying containers in an edge computing system.

FIG. 5 illustrates additional compute arrangements deploying containers in an edge computing system. As a simplified example, system arrangements 510, 520 depict settings in which a pod controller (e.g., container managers 511, 521, and a container orchestrator 531) is adapted to launch containerized pods, functions, and functions-as-a-service instances through execution via compute nodes (515 in arrangement 510), or to separately execute containerized virtualized network functions through execution via compute nodes (523 in arrangement 520). This arrangement is adapted for use of multiple tenants in an example system arrangement 530 (using compute nodes 537), where containerized pods (e.g., pods 512), functions (e.g., functions 513, VNFs 522, 536), and functions-as-a-service instances (e.g., FaaS instance 514) are launched within virtual machines (e.g., VMs 534, 535 for tenants 532, 533) specific to respective tenants (aside the execution of virtualized network functions). This arrangement is further adapted for use in system arrangement 540, which provides containers 542, 543, or execution of the various functions, applications, and functions on compute nodes 544, as coordinated by an container-based orchestration system 541.

The system arrangements of depicted in FIG. 5 provides an architecture that treats VMs, Containers, and Functions equally in terms of application composition (and resulting applications are combinations of these three ingredients). Each ingredient may involve use of one or more accelerator (FPGA, ASIC) components as a local backend. In this manner, applications can be split across multiple edge owners, coordinated by an orchestrator.

In the context of FIG. 5, the pod controller/container manager, container orchestrator, and individual nodes may provide a security enforcement point. However, tenant isolation may be orchestrated where the resources allocated to a tenant are distinct from resources allocated to a second tenant, but edge owners cooperate to ensure resource allocations are not shared across tenant boundaries. Or, resource allocations could be isolated across tenant boundaries, as tenants could allow "use" via a subscription or transaction/contract basis. In these contexts, virtualization, containerization, enclaves and hardware partitioning schemes may be used by edge owners to enforce tenancy. Other isolation environments may include: bare metal (dedicated) equipment, virtual machines, containers, virtual machines on containers, or combinations thereof.

In further examples, aspects of software-defined or controlled silicon hardware, and other configurable hardware, may integrate with the applications, functions, and services an edge computing system. Software defined silicon may be used to ensure the ability for some resource or hardware ingredient to fulfill a contract or service level agreement, based on the ingredient's ability to remediate a portion of itself or the workload (e.g., by an upgrade, reconfiguration, or provision of new features within the hardware configuration itself).

Figure 6:
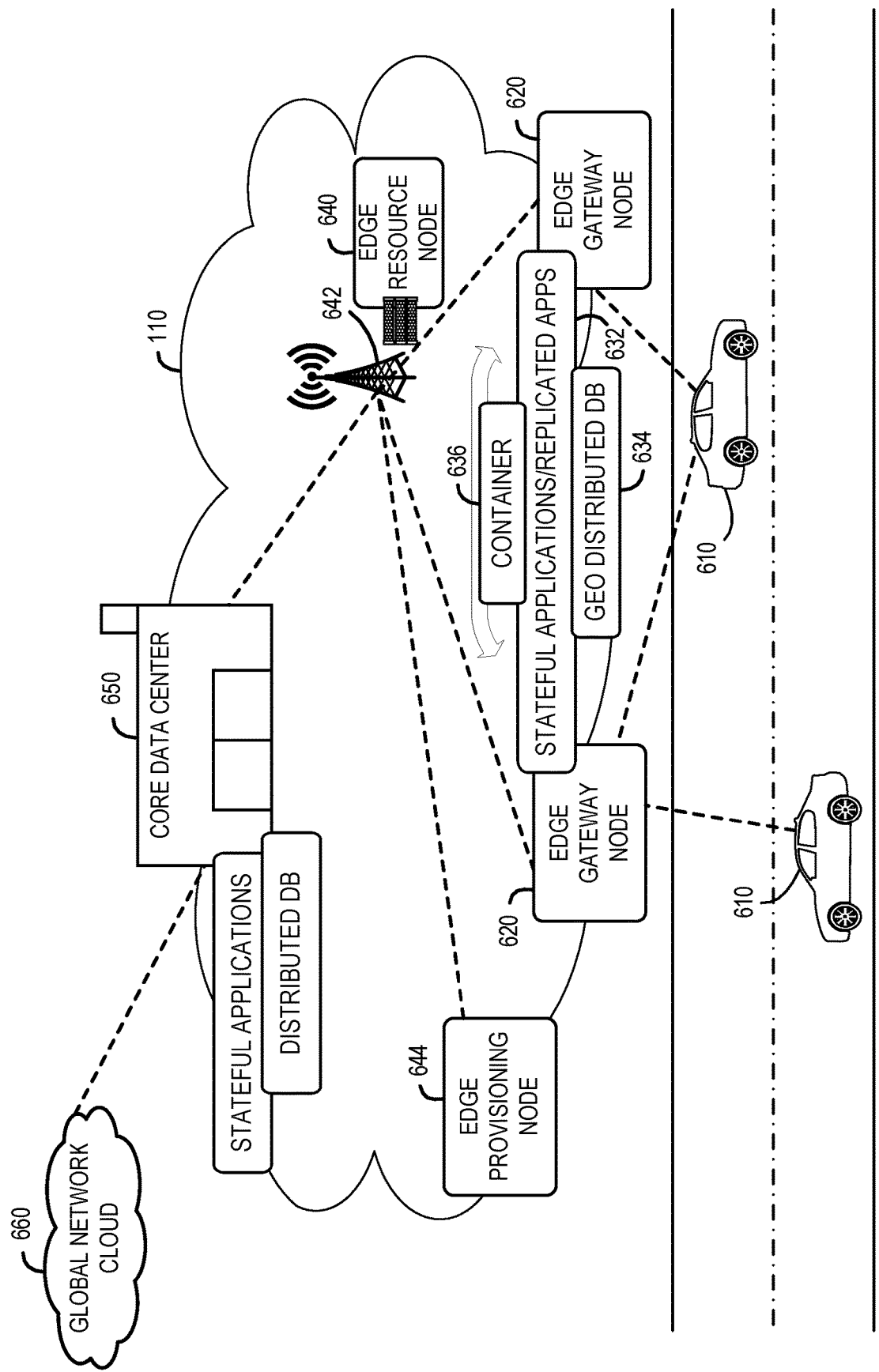
FIG. 6 illustrates an example compute and communication use case involving mobile access to applications in an example edge computing system.

It should be appreciated that the edge computing systems and arrangements discussed herein may be applicable in various solutions, services, and/or use cases involving mobility. As an example, FIG. 6 shows an example simplified vehicle compute and communication use case involving mobile access to applications in an example edge computing system 600 that implements an edge cloud such as the edge cloud 110 of FIG. 1. In this use case, respective client compute nodes 610 may be embodied as in-vehicle compute systems (e.g., in-vehicle navigation and/or infotainment systems) located in corresponding vehicles which communicate with example edge gateway nodes 620 during traversal of a roadway. For instance, the edge gateway nodes 620 may be located in a roadside cabinet or other enclosure built-into a structure having other, separate, mechanical utility, which may be placed along the roadway, at intersections of the roadway, or other locations near the roadway. As respective vehicles traverse along the roadway, the connection between its client compute node 610 and a particular one of the edge gateway nodes 620 may propagate so as to maintain a consistent connection and context for the example client compute node 610. Likewise, mobile edge nodes may aggregate at the high priority services or according to the throughput or latency resolution requirements for the underlying service(s) (e.g., in the case of drones). The respective edge gateway devices 620 include an amount of processing and storage capabilities and, as such, some processing and/or storage of data for the client compute nodes 610 may be performed on one or more of the edge gateway nodes 620.

The edge gateway nodes 620 may communicate with one or more edge resource nodes 640, which are illustratively embodied as compute servers, appliances or components located at or in a communication base station 642 (e.g., a based station of a cellular network). As discussed above, the respective edge resource node(s) 640 include an amount of processing and storage capabilities and, as such, some processing and/or storage of data for the client compute nodes 610 may be performed on the edge resource node(s) 640. For example, the processing of data that is less urgent or important may be performed by the edge resource node(s) 640, while the processing of data that is of a higher urgency or importance may be performed by the edge gateway devices 620 (depending on, for example, the capabilities of each component, or information in the request indicating urgency or importance). Based on data access, data location or latency, work may continue on edge resource nodes when the processing priorities change during the processing activity. Likewise, configurable systems or hardware resources themselves can be activated (e.g., through a local orchestrator) to provide additional resources to meet the new demand (e.g., adapt the compute resources to the workload data).

The edge resource node(s) 640 also communicate with the core data center 650, which may include compute servers, appliances, and/or other components located in a central location (e.g., a central office of a cellular communication network). The example core data center 650 may provide a gateway to the global network cloud 660 (e.g., the Internet) for the edge cloud 110 operations formed by the edge resource node(s) 640 and the edge gateway devices 620. Additionally, in some examples, the core data center 650 may include an amount of processing and storage capabilities and, as such, some processing and/or storage of data for the client compute devices may be performed on the core data center 650 (e.g., processing of low urgency or importance, or high complexity).

The edge gateway nodes 620 or the edge resource node(s) 640 may offer the use of stateful applications 632 and a geographic distributed database 634. Although the applications 632 and database 634 are illustrated as being horizontally distributed at a layer of the edge cloud 110, it will be understood that resources, services, or other components of the application may be vertically distributed throughout the edge cloud (including, part of the application executed at the client compute node 610, other parts at the edge gateway nodes 620 or the edge resource node(s) 640, etc.). Additionally, as stated previously, there can be peer relationships at any level to meet service objectives and obligations. Further, the data for a specific client or application can move from edge to edge based on changing conditions (e.g., based on acceleration resource availability, following the car movement, etc.). For instance, based on the "rate of decay" of access, prediction can be made to identify the next owner to continue, or when the data or computational access will no longer be viable. These and other services may be utilized to complete the work that is needed to keep the transaction compliant and lossless.

In further scenarios, a container 636 (or pod of containers) may be flexibly migrated from one of the edge nodes 620 to other edge nodes (e.g., another one of edge nodes 620, one of the edge resource node(s) 640, etc.) such that the container with an application and workload does not need to be reconstituted, re-compiled, re-interpreted in order for migration to work. However, in such settings, there may be some remedial or "swizzling" translation operations applied. For example, the physical hardware at the edge resource node(s) 640 may differ from the hardware at the edge gateway nodes 620 and therefore, the hardware abstraction layer (HAL) that makes up the bottom edge of the container will be re-mapped to the physical layer of the target edge node. This may involve some form of late-binding technique, such as binary translation of the HAL from the container native format to the physical hardware format, or may involve mapping interfaces and operations. A pod controller may be used to drive the interface mapping as part of the container lifecycle, which includes migration to/from different hardware environments.

The scenarios encompassed by FIG. 6 may utilize various types of mobile edge nodes, such as an edge node hosted in a vehicle (car/truck/tram/train) or other mobile unit, as the edge node will move to other geographic locations along the platform hosting it. With vehicle-to-vehicle communications, individual vehicles may even act as network edge nodes for other cars, (e.g., to perform caching, reporting, data aggregation, etc.). Thus, it will be understood that the application components provided in various edge nodes may be distributed in static or mobile settings, including coordination between some functions or operations at individual endpoint devices or the edge gateway nodes 620, some others at the edge resource node(s) 640, and others in the core data center 650 or global network cloud 660.

In further configurations, the edge computing system may implement FaaS computing capabilities through the use of respective executable applications and functions. In an example, a developer writes function code (e.g., "computer code" herein) representing one or more computer functions, and the function code is uploaded to a FaaS platform provided by, for example, an edge node or data center. A trigger such as, for example, a service use case or an edge processing event, initiates the execution of the function code with the FaaS platform.

In an example of FaaS, a container is used to provide an environment in which function code (e.g., an application which may be provided by a third party) is executed. The container may be any isolated-execution entity such as a process, a Docker or Kubernetes container, a virtual machine, etc. Within the edge computing system, various datacenter, edge, and endpoint (including mobile) devices are used to "spin up" functions (e.g., activate and/or allocate function actions) that are scaled on demand. The function code gets executed on the physical infrastructure (e.g., edge computing node) device and underlying virtualized containers. Finally, container is "spun down" (e.g., deactivated and/or deallocated) on the infrastructure in response to the execution being completed.

Further aspects of FaaS may enable deployment of edge functions in a service fashion, including a support of respective functions that support edge computing as a service (Edge-as-a-Service or "EaaS"). Additional features of FaaS may include: a granular billing component that enables customers (e.g., computer code developers) to pay only when their code gets executed; common data storage to store data for reuse by one or more functions; orchestration and management among individual functions; function execution management, parallelism, and consolidation; management of container and function memory spaces; coordination of acceleration resources available for functions; and distribution of functions between containers (including "warm" containers, already deployed or operating, versus "cold" which require initialization, deployment, or configuration).

The edge computing system 600 can include or be in communication with an edge provisioning node 644. The edge provisioning node 644 can distribute software such as the example computer readable instructions 1482 of FIG. 14B, to various receiving parties for implementing any of the methods described herein. The example edge provisioning node 644 may be implemented by any computer server, home server, content delivery network, virtual server, software distribution system, central facility, storage device, storage node, data facility, cloud service, etc., capable of storing and/or transmitting software instructions (e.g., code, scripts, executable binaries, containers, packages, compressed files, and/or derivatives thereof) to other computing devices. Component(s) of the example edge provisioning node 644 may be located in a cloud, in a local area network, in an edge network, in a wide area network, on the Internet, and/or any other location communicatively coupled with the receiving party(ies). The receiving parties may be customers, clients, associates, users, etc. of the entity owning and/or operating the edge provisioning node 644. For example, the entity that owns and/or operates the edge provisioning node 644 may be a developer, a seller, and/or a licensor (or a customer and/or consumer thereof) of software instructions such as the example computer readable instructions 1482 of FIG. 14B. The receiving parties may be consumers, service providers, users, retailers, OEMs, etc., who purchase and/or license the software instructions for use and/or re-sale and/or sub-licensing.

In an example, edge provisioning node 644 includes one or more servers and one or more storage devices. The storage devices host computer readable instructions such as the example computer readable instructions 1482 of FIG. 14B, as described below. Similarly to edge gateway devices 620 described above, the one or more servers of the edge provisioning node 644 are in communication with a base station 642 or other network communication entity. In some examples, the one or more servers are responsive to requests to transmit the software instructions to a requesting party as part of a commercial transaction. Payment for the delivery, sale, and/or license of the software instructions may be handled by the one or more servers of the software distribution platform and/or via a third party payment entity. The servers enable purchasers and/or licensors to download the computer readable instructions 1482 from the edge provisioning node 644. For example, the software instructions, which may correspond to the example computer readable instructions 1482 of FIG. 14B, may be downloaded to the example processor platform/s, which is to execute the computer readable instructions 1482 to implement the methods described herein.

In some examples, the processor platform(s) that execute the computer readable instructions 1482 can be physically located in different geographic locations, legal jurisdictions, etc. In some examples, one or more servers of the edge provisioning node 644 periodically offer, transmit, and/or force updates to the software instructions (e.g., the example computer readable instructions 1482 of FIG. 14B) to ensure improvements, patches, updates, etc. are distributed and applied to the software instructions implemented at the end user devices. In some examples, different components of the computer readable instructions 1482 can be distributed from different sources and/or to different processor platforms; for example, different libraries, plug-ins, components, and other types of compute modules, whether compiled or interpreted, can be distributed from different sources and/or to different processor platforms. For example, a portion of the software instructions (e.g., a script that is not, in itself, executable) may be distributed from a first source while an interpreter (capable of executing the script) may be distributed from a second source.

In further examples, any of the compute nodes or devices discussed with reference to the present edge computing systems and environment may be fulfilled based on the components depicted in FIGS. 14A and 14B. Respective edge compute nodes may be embodied as a type of device, appliance, computer, or other "thing" capable of communicating with other edge, networking, or endpoint components. For example, an edge compute device may be embodied as a personal computer, server, smartphone, a mobile compute device, a smart appliance, an in-vehicle compute system (e.g., a navigation system), a self-contained device having an outer case, shell, etc., or other device or system capable of performing the described functions.

Figure 7:
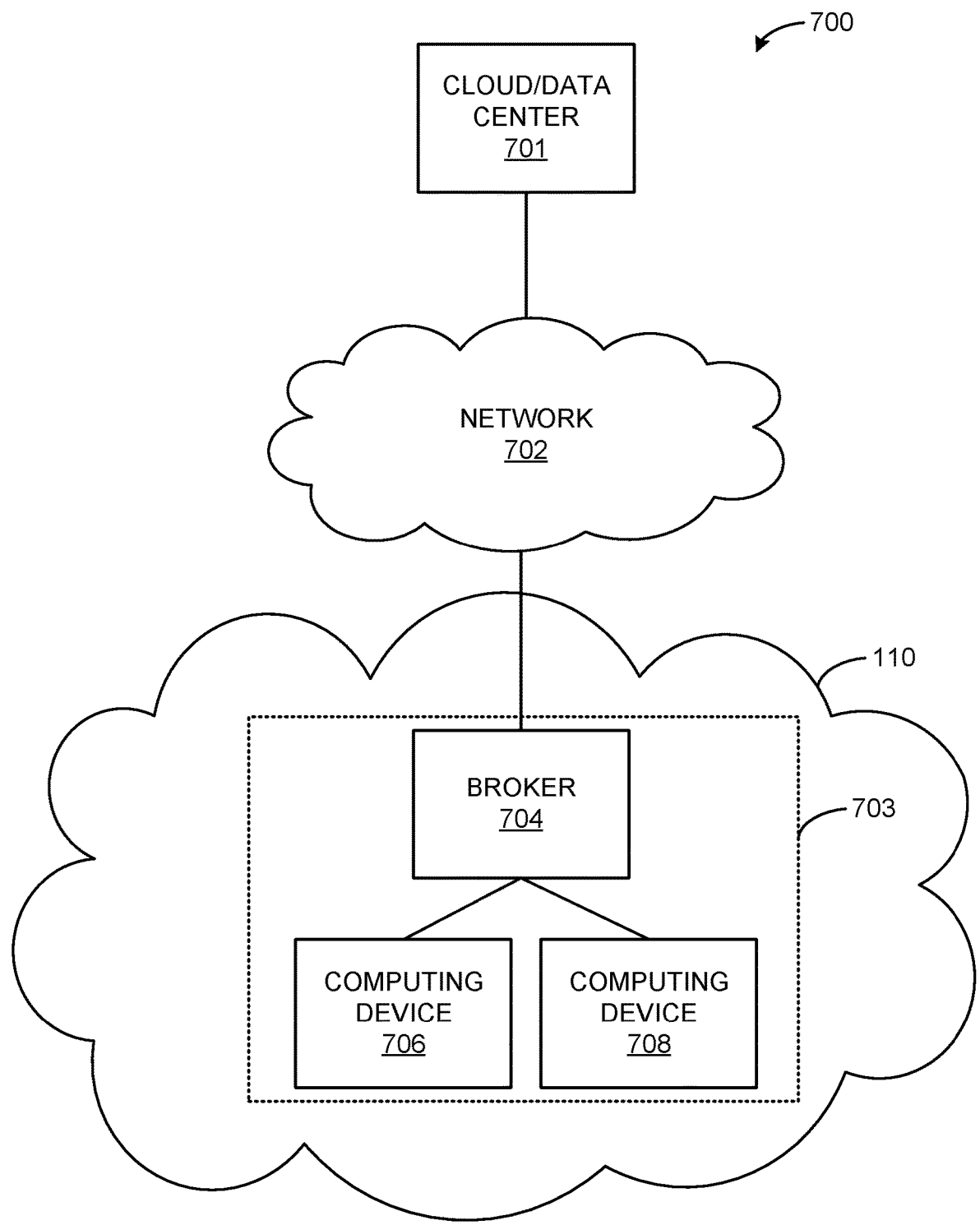
FIG. 7 is a block diagram of an example system described in conjunction with examples disclosed herein to manage quality of service.

FIG. 7 is a block diagram of an example environment 700 to facilitate managing quality of service in accordance with examples disclosed herein. The example environment 700 includes the example edge cloud 110 of FIGS. 1, 2, 3, and/or 6 and an example cloud/data center 701, an example network 702, an example domain 703, an example broker 704, and example computing devices 706, 708. Although the example of FIG. 7 corresponds to a cloud-based network, examples disclosed herein can be applied to any type of computing environment (e.g., virtual machines, racks of servers, etc.). In some examples, the cloud/data center 701 corresponds to the cloud/data center 360, 440 of FIGS. 3 and/or 4 and/or the global network cloud 660 of FIG. 6. Additionally, the example computing devices 706, 708 may correspond to the example edge nodes 422, 424, 620, 644 of FIGS. 4 and/or 6.

The example cloud/data center 701 of FIG. 7 is a computing device that interfaces with the example broker 704 and/or the example computing devices 706, 708 (e.g., via the example network 702) to monitor and/or facilitate operation of connected devices. In some examples, the cloud/data center 701 may obtain data from computing devices to perform more computationally intensive tasks. In some examples, the cloud/data center 701 may deploy tasks to be performed at other computing devices (e.g., the example computing devices 706, 708). The example cloud-based server 701 may be implemented in a private cloud and/or a public cloud. In some examples, the cloud/data center 701 is a server that implements and manages virtual machines or servers in a rack.

The example network 702 of FIG. 7 is a system of interconnected systems exchanging data between the cloud/data center 701 and processing devices (e.g., the broker 704 and/or the computing devices 706, 708). The example network 702 may be implemented using any type of public or private network such as, but not limited to, the Internet, a telephone network, a local area network (LAN), a cable network, and/or a wireless network. To enable communication via the example network 702, the cloud/data center 701, the broker 704 and/or the computing devices 706, 708 include(s) a communication interface that enables a connection to an Ethernet, a digital subscriber line (DSL), a telephone line, a coaxial cable, any wireless connection, etc.

The example domain 703 of FIG. 7 includes the example broker 704 and the example computing devices 706, 708. The example domain 703 may be an edge domain, a fog domain, and IoT domain, a virtual machine (VM) domain, a multi-access edge computing (MEC) domain, etc. Although the example domain 703 includes one broker 704 and two computing devices 706, 708, the domain 703 may include any number of brokers and/or computing devices. Additionally, there may be other domains connected via the network 702 (e.g., in the same edge network 110 or a different edge network). As used herein, communication between a device in the domain 703 and a device outside of the domain 703 is referred to as inter-domain communication and communication between devices within the domain 703 is referred to as intra-domain communication.

The example broker 704 of FIG. 7 manages the use of the pooled resources of the example computing devices 706, 708 based on QoS requirements corresponding to a service request. For example, the broker 704 may obtain a service request (e.g., to perform one or more tasks) from one of the computing devices 706, 708, a computing device from a different domain (e.g., via another broker), and/or the cloud/data center 701. After the service request is obtained, the broker 704 identifies the SLA/SLO requirements corresponding to the service request and transmits the SLA/SLO requirements to the computing devices 706, 708 of the domain 703. As further described below, the example computing devices 706, 708 determine whether they have the capacity to achieve the SLA/SLO requirements and return a response to the broker 704. After the example broker 704 receives the responses, the broker 704 allocates the pooled resources of the computing devices 706, 708 based on their response to service the request while best achieving the corresponding SLA/SLO requirements. In some examples, the broker 704 could be implemented within the example computing devices 706, 708 (e.g., one of the computing devices acting as a lead computing device and/or in both devices). The example broker 704 is further described below in conjunction with FIG. 10A.

The example computing devices 706, 708 of FIG. 7 may be edge devices, IoT devices, fog devices, virtual machines, servers, and/or any other type of computing device. In some examples, the computing devices 706, 708 obtain SLA/SLO requirements based on a service request corresponding to pooled resources. Pooled resources may be memory, storage, hardware accelerators, etc. that may be shared by each other and/or any other device in the domain 703 (e.g., inter domain) and/or another domain (e.g., intra domain). The example computing devices 706, 708 include pooled QoS controllers to determine the necessary amount of memory and/or processor resources needed to satisfy the SLA/SLO requirement. After the amount of resources are determined, the pooled QoS controllers determine whether the respective computing device 706, 708 have enough available memory and/or processing resources to satisfy the determined amount of resources. The example computing devices 706, 708 send a response to the broker 704 based on whether or not the computing devices 706, 708 have enough available resources to service the request according to the SLA/SLO requirements. If the example broker 704 determines that one or more of the computing devices 706, 708 should service some or all of the service request, the broker 704 will transmit instructions on how to service the part or all of the service request and the computing device 706 will service some or all of the service request based on the instructions. The pooled QoS controller of the computing device 706 is further described below in conjunction with FIG. 10A.

In some examples, the computing devices 706, 708 of FIG. 7 leverage a mesh proxy to include RDT support to allow applications to be implemented without including an SLA/SLO library, launcher, and/or administrator to translate SLAs to resource-based attributes to resource-based attributes and generate RDT control signals based on the resource-based attributes for different computing device types (e.g., applications can be platform-agnostic (e.g., not specific to a particular operating system and/or hardware) and include application-specific logic without platform-specific logic). In this manner, the size and complexity of applications are reduced. In such examples, the mesh proxy obtains proxied high-level SLA/SLO management information (e.g., SLA/SLO requirements), converts the requirements into resource-based attributes, generates the RDT control information (e.g., the amount of resources needed to satisfy the SLA/SLO requirements based on the resource-based attributes), and sends the RDT control information to the OS of the computing device 706. The OS can utilize RDT extensions to ensure that the processor and/or memory resources corresponding to the RDT control signal are utilized to satisfy the SLA/SLO. Additionally, the computing devices 706, 708 can utilize a software (soft) QoS mesh to perform load balancing between multiple applications with multiple different SLA/SLO requirements, as further described below in conjunction with FIG. 9. The example mesh proxy is further described below in conjunction with FIGS. 8 and 9, and the soft QoS mesh is further described below in conjunction with FIG. 9.

Figure 8:
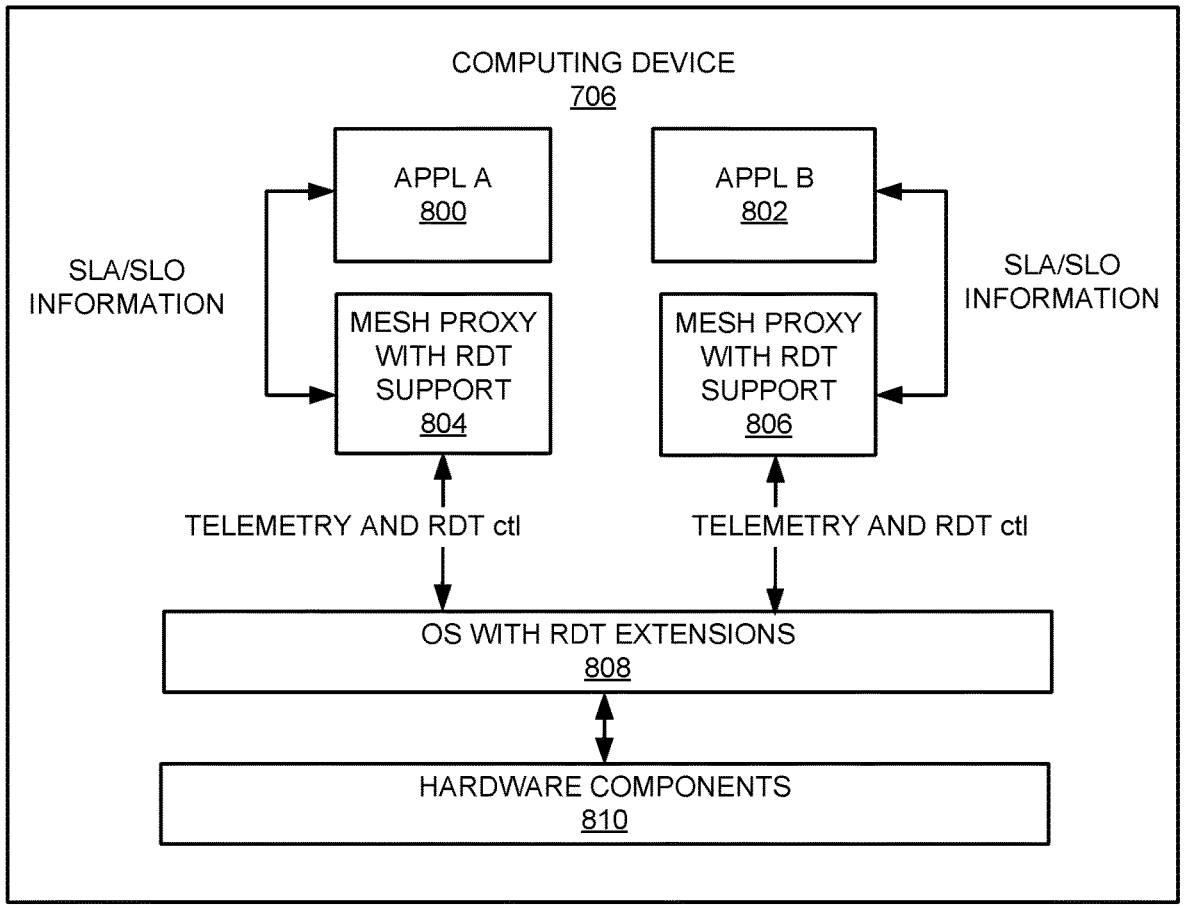
FIG. 8 is a block diagram of an implementation of the example computing device of FIG. 7.

FIG. 8 is a block diagram of an example implementation of the example computing device 706 of FIG. 1. The example computing device 706 includes example applications 800, 802, example mesh proxies 804, 806, an example OS 808, and example hardware components 810. Although the example computing device 706 of FIG. 8 includes two applications and two mesh proxies, the computing device 706 may include any number of computing devices and/or mesh proxies.

The example applications 800, 802 of FIG. 8 are applications that have been installed and/or downloaded onto the example computing device 706. The example applications 800, 802 include code that, when executed by the OS 808 execute one or more tasks. As described above, because the mesh proxy 804 includes RDT support, the example applications 800 are platform-agnostic (e.g., OS and/or hardware agnostic). The example applications 800, 802 can include high-level SLA management information corresponding to SLA/SLO requirements. The corresponding mesh proxy 804, 806 that has been assigned to the respective applications 800, 802 converts the SLA management information into resource-based attributes. In this manner, the corresponding mesh proxy 804, 806 generates a RDT control signal to reserve the processor and/or memory resources needed to satisfy the SLA/SLO requirements, without the need of SLA launcher or SLA libraries corresponding to the applications 800, 802. The example applications 800, 802 may be deployed from the cloud-based server 701 (FIG. 1) and/or from another computing device in the domain 703 (FIG. 1) and/or another domain.

The example mesh proxies 804, 806 of FIG. 8 are components that bridge communication between the applications 800, 802 and the OS 808. In this manner, the applications 800, 802 can transmit SLA/SLO requirements to the example respective mesh proxies 804, 806, and the mesh proxies 804, 806 can convert the SLA/SLO requirements into resource-based attributes to generate a RDT control signal corresponding to the amount of memory and/or processor resources needed to satisfy the SLA/SLO requirements. Additionally, the example mesh proxies 804, 806 may obtain telemetry data from the OS 808. Telemetry data includes data that is used to monitor performance and availability of hardware components 810 (e.g., processor cores, memory, storage, central processing unit (CPU), GPU, and/or any other hardware components). The example mesh proxies 804, 806 may analyze the telemetry data to determine if the SLA/SLO requirements are satisfied and/or may transmit the telemetry data and/or a compliance indication to the respective applications 800, 802. Because the processing of telemetry data is performed by the mesh proxies 804, 806 (e.g., as opposed to the applications 800, 802), the applications 800, 802 can be freely migrated or replicated for load balancing, elastic scaling, etc., without being made specific to the configurations and specialized acceleration available in a computing device. Additionally, processing telemetry data at the mesh proxies 804, 806 allows the computing device 706 to perform software based QoS and software based hierarchical QoS, as further described below in conjunction with FIG. 9.

In some examples, the telemetry data may be privacy sensitive. Consumers of telemetry data could use the telemetry data to infer information that goes beyond the immediate operation of the entity that consumes it. For example, a load balancer may use the telemetry data to improve load-balancing efficiency and may also use the telemetry data to build a sophisticated artificial intelligence (e.g., machine learning, deep learning, neural network, etc.) model to generate inference data. In some examples (e.g., when such data is private or valuable), the telemetry data may be encrypted to a trusted execution environment (TEE). Thus, the example mesh proxies 804, 806 may require telemetry inference application be authorized to perform a specific optimization function with the TEE. An example TEE is further described below in conjunction with FIG. 14.

The example OS 808 of FIG. 8 obtains RDT control instructions from the example mesh proxies 804, 806 and reserve the hardware components 810 based on the RDT control signal (e.g., using RDT extensions) to ensure that the corresponding SLA/SLO requirements are met. After the hardware is reserved, the example OS 808 executes the instructions of the application(s) 800, 802 using the reserved hardware components 810 to satisfy the SLA/SLO requirements. Additionally, the example OS 808 monitors the hardware components 810 to develop telemetry data corresponding to the use of the hardware components 810 (e.g., bandwidth, latency, latency divergence, jitter, number of packet drops, etc.). The example OS 808 transmits the telemetry data to the corresponding mesh proxy 804, 806 periodically, aperiodically, and/or based on a trigger. The example OS 808 utilizes the hardware components 810 to execute the instructions of the application 800. The hardware components 810 may include processor cores, CPU, GPU, memory, storage, hardware accelerators, etc.

Figure 9:
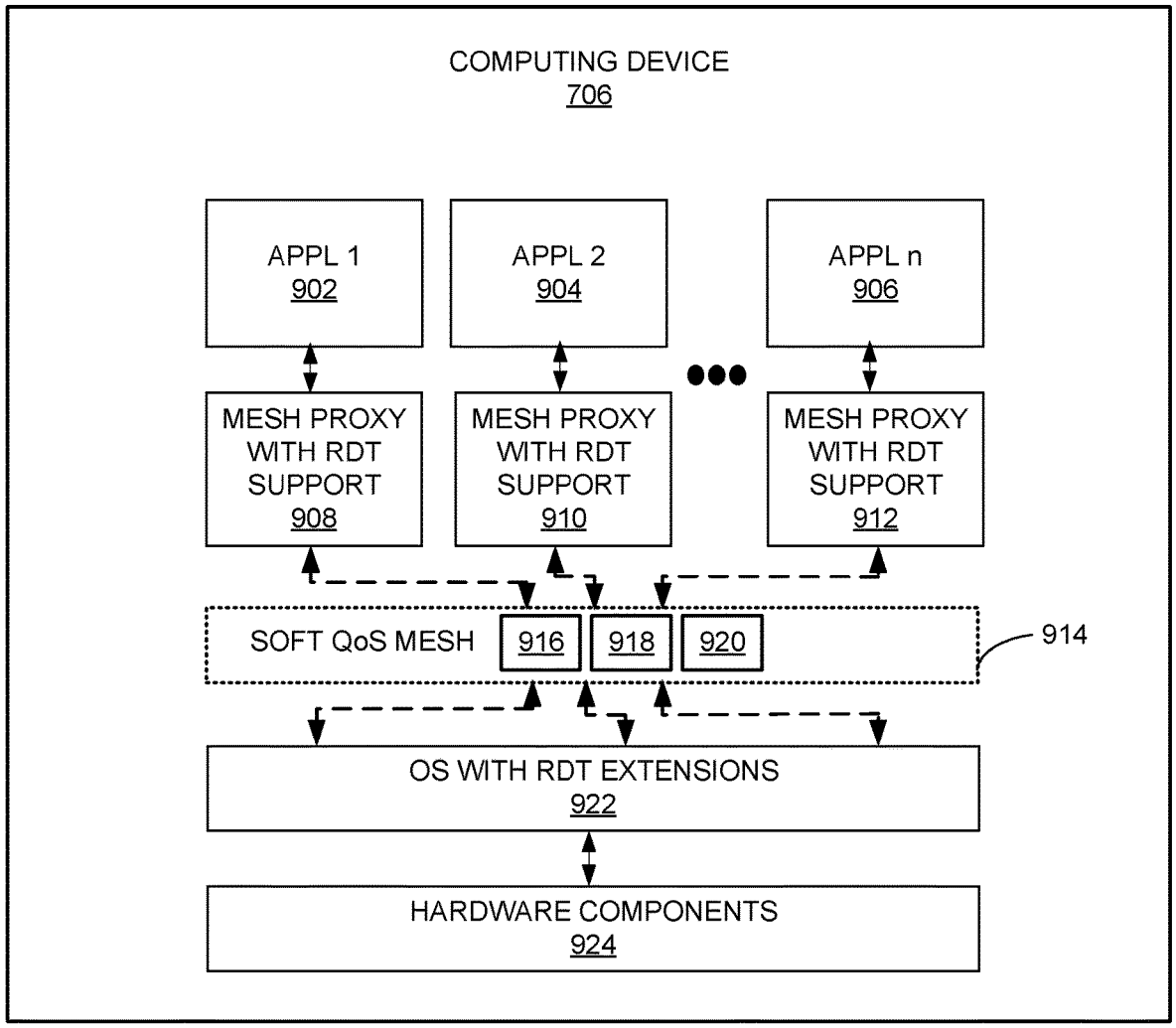
FIG. 9 is another block diagram of an implementation of the example computing device of FIG. 7.

FIG. 9 is a block diagram of an alternative example implementation of the example computing device 706 of FIG. 1. The example computing device 706 includes example applications 900, 902, 904, example mesh proxies 908, 910, 912, an example soft QoS mesh network 914, an example interface 916, an example hierarchy generator 918, an example load balancer 920, an example OS 922, and example hardware components 924. The example applications 902, 904, 906 operate like the example applications 800, 802 of FIG. 8, the example mesh proxies 908, 910, 912 operate like the example mesh proxies 804, 806 of FIG. 8, the example OS 922 operates like the example OS 808 of FIG. 8, and the example hardware components 924 operate like the example hardware components 810 of FIG. 8.

In the example of FIG. 9, the example soft QoS mesh network 914 is a software-based component connected between the mesh proxies 908, 910, 912 and the OS 922. The example soft QoS mesh network 914 includes the example interface 916, the example hierarchy generator 918, and the example load balancer 920.

The example interface 916 of FIG. 9 obtains RDT control signals from the example mesh proxy 908, 910, 912. As described above, the RDT control signals identify how much memory and/or processor resources are needed to execute the respective applications 902, 904, 906 while satisfying corresponding SLA/SLO requirements. The example interface 916 also receives telemetry data from the example OS 922 corresponding to the use and/or capacity of the hardware components 924. In some examples, the interface 916 may transmit telemetry data corresponding to an application to the corresponding mesh proxy 908, 910, 912. The example interface 916 transmits allocation instructions to the example OS 922 to inform the OS 922 how to allocate resources of the hardware components 924 for the example applications 902, 904, 906 after the load balancer 920 has determined how to allocate the resources, as further described below.

The example hierarchy generator 918 of FIG. 9 may group applications together and/or generate a resource hierarchy for the applications 902, 904, 906. For example, the application 902 may be labelled or otherwise identified as high priority, while the remaining applications 904, 906 may be labelled as low priority. In such examples, the hierarchy generator 918 may reserve and/or otherwise prioritize the SLA/SLO requirements and/or hardware components 924 for the first application 902. In some examples, the hierarchy generator 918 develops a resource allocation that reserves some amount or percentage of the hardware components 924 for the application 902 and leaves the remaining amount or percentage of hardware components 924 for the remaining applications 904, 906. The amount of reservation and/or the number of groups and/or hierarchies (e.g., high, medium, low, etc.) may be based on user preferences, manufacturer preferences, application preferences, and/or availability of the example hardware components 924.

The example hierarchy generator 918 of FIG. 9 may also determine that an application has changed from a first priority to a second priority based on a trigger (e.g., an event occurring). For example, the application 902 may include code that corresponds to the application 902 being low priority unless the latency does not satisfy a threshold and/or a particular section of code is to be executed. In such examples, the application 902 may change from a low priority to a high priority if the latency no longer satisfies the threshold and/or if the particular section of code is to be executed. The example application 902 may return to low priority after the latency satisfies the threshold and/or the particular section of code is no longer being executed. In such examples, the hierarchy generator 818 monitors the telemetry data and/or other data to determine if the latency and/or the code being executed by the OS 922 to determine whether to initiate or change a hierarchy structure because of a priority status change. If the example hierarchy generator 818 determines that there is a priority status change, the hierarchy generator 818 restructures and/or creates the hierarchy structure for the applications 902, 904, 906 based on the priority status change.

The example load balancer 920 of FIG. 9 performs a cross-application balance of resources before sending resource allocation instructions to the OS 922). The example load balancer 920 performs the cross-application balance by determining how much of resources (e.g., the hardware components 924) to allocate for the respective applications 902, 904, 906) based on the respective received RDT control signals from the corresponding mesh proxies 908, 910, 912 and/or the hierarchy generated by the example hierarchy generator 918. Once the resource allocation is complete, the example load balancer 920 transmits allocation instructions to the OS 922 using the interface 916. In this manner, the example load balancer 920 allocates resources to efficiently balance the SLA/SLO requirements of each application 902, 904, 906 while prioritizing the applications 902, 904, 906 based on a generated hierarchy (e.g., if one is generated). Additionally, the example load balancer 920 can continuously change resource allocation in response to changing dynamic conditions. For example, if an application has been identified to be at risk for failing its SLA/SLO, the example load balancer 920 can temporarily elevate the application to a higher priority and give additional resources reserved for another application (e.g., that the application does not need or can do without). The example load balancer 920 can dynamically adjust resource allocation without requiring any changes to the example applications 902, 904, 906.

Figure 10A:
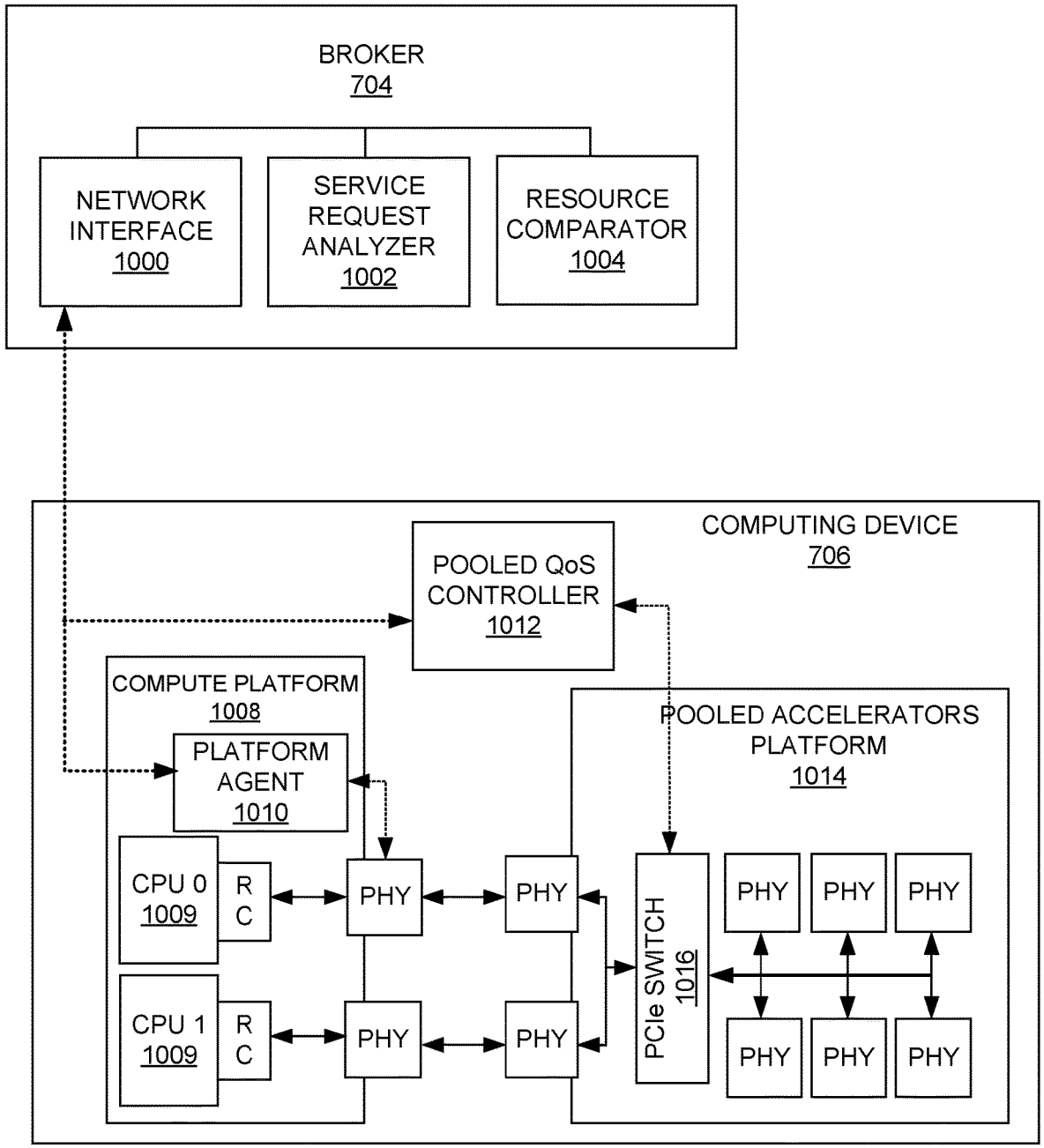
FIG. 10A-C are a block diagrams of implementations of the example broker and the example computing device of FIG. 7.

FIG. 10A is a block diagram of an example implementation of the example broker 704 and the example computing device 706 of FIG. 1. The example broker 704 of FIG. 10A includes an example network interface 1000, an example service request analyzer 1002, and an example resource comparator 1004. The example computing device 706 of FIG. 10A includes an example compute platform 1008, example CPUs 1009, an example platform agent 1010, an example pooled QoS controller 1012, an example pooled accelerator platform 1014, and an example PCIe switch 1016. The example computing device 706 may additionally or alternatively include any of the example components illustrated in FIGS. 8 and/or 9. In some examples, the compute platform 1008 and the example pooled accelerators platform 1014 may be included in the hardware components 810 and/or the hardware components 924.

The example network interface 1000 of FIG. 10A receives service requests from intra domain and/or inter domain devices (e.g., via the network 702 of FIG. 1). After a service request is received and/or processed, the example network interface 1000 transmits the service request and/or the SLA/SLO requirements to the example pooled QoS controller 1012 of the computing device 706. The example pooled QoS controller 1012 transmits a response to identify the capability of the pooled accelerator platform 1014 to service the requests based on the SLA/SLO requirements. The example network interface 1000 obtains the response and may transmit instructions to the platform agent 1010 of the compute platform 1008 to service part or all of the service request. In some examples, the network interface 1000 may transmit a flag or other indication that the computing device 706 has insufficient resources when, for example, the pooled QoS controller 1012 indicates that the pooled accelerator platform 1014 has insufficient resources to service a service request. For example, the network interface 1000 may transmit a flag to the cloud/data center 701 or another entity that tracks the computing device 706. In this manner, the example cloud/data center 701 or other entity can deploy more resources to and/or otherwise update/adjust the example computing device 706.

The example service request analyzer 1002 analyzes received service requests to determine the amount of resources (e.g., CPU, GPU memory, etc.) needed to service the service request. For example, a received service request may include, or be associated by configuration with, an SLA and/or an SLO that indicates requirements for servicing the service request. The example service request analyzer 1002 identifies the SLA and/or SLO requirements. The service request analyzer 1002 may transmit the SLO/SLA requirements and/or service request to the example pooled QoS controller 1012 to determine if the pooled accelerators platform has capacity to service the request according to the SLA/SLO requirements. Additionally or alternatively, the service request analyzer 1002 may convert the SLA/SLO requirements into an amount of resources and transmit the amount of resources to the example pooled QoS controller 1012 to determine if the pooled accelerators platform 1014 has capacity to service the request according to the amount of resources. Additionally or alternatively, the example service request analyzer 1002 may transmit a request for resource capacity information from the pooled QoS controller 1012 and then the resource comparator 1004 locally determines if the pooled accelerators platform 1014 has sufficient capacity to service the request according to the SLA/SLO requirements.

The example resource comparator 1004 of FIG. 10A compares the amount of available pooled resources from connected devices (e.g., the example computing device 706, the example computing device 708 of FIG. 1, etc.) to determine how to service the request. The example resource comparator 1004 may have the service request serviced at one computing device or multiple computing devices based on the availability of pooled resources and the SLA/SLO requirements. In some examples, the resource comparator 1004 determines how to service the request based on capacity information sent from the pooled QoS controller 1012 (e.g., when the pooled QoS controller 1012 sends its resource capability). In such examples, the resource comparator 1004 may flag devices that do not have sufficient resources to service the request.

The example compute platform 1008 of FIG. 10A includes processor resources (e.g., the CPUs 1009) and resource controllers (RCs) to perform tasks. Accordingly, the example compute platform 1008 includes a pure CPU structure. The example CPUs 1009 are CPU hardware (HW) or CPU platforms. Although the example compute platform 1008 includes the example CPUs 1009, the compute platform 1008 may include any number of CPUs. The example compute platform 1008 further includes the platform agent 1010 to control the physical layers (PHYs) to interface with the pooled accelerators platform 1014 to use the pooled accelerators to perform a task based on instructions from the broker 704 (e.g., after the broker 704 selects the computing device 706 to service a service request).

The example pooled QoS controller 1012 of FIG. 10A receives information from the broker 704 and determines the capability and/or capacity of the pooled resources in the pooled accelerators platform 1014 by interfacing with the PCIe switch 1016 (or other device interconnect fabric switch). If the example broker 704 determines the amount of resources necessary to satisfy the SLA/SLO requirement from a service request and transmits the amount and/or characteristics of the resources to the pooled QoS controller 1012, the pooled QoS controller 1012 determines if there are sufficient available resources to satisfy the identified amount and/or characteristics of the resources. If the example broker 704 provides the SLA/SLO requirements, the pooled QoS controller 1012 determines the amount/characteristics of resources necessary to satisfy the SLA/SLO requirements and determines if the amount/characteristics of resources is available for use in the pooled accelerators platform 1014. If the example broker 704 requests information, the example pooled QoS controller 1012 determines the capability and/or capacity of the pooled accelerators platforms 1014 and returns the capability and/or capacity information.

Although the example computing device 706 includes the example pooled accelerators platform 1014 with pooled accelerator resources, the example computing device 706 may additionally or alternatively include a different pooled resource. For example, the computing device 706 may include pooled memory platform with pooled memory resources. In such an example, the pooled QoS controller 1012 (e.g., enabled with RDT functionality) interfaces with the pooled memory platform in a similar manner as is described above to perform cache monitoring, cache allocation, memory bandwidth monitoring, and memory bandwidth allocation. In this manner, the pooled QoS controller 1012 can provide pooled memory information for servicing a service request.

Figure 10B:
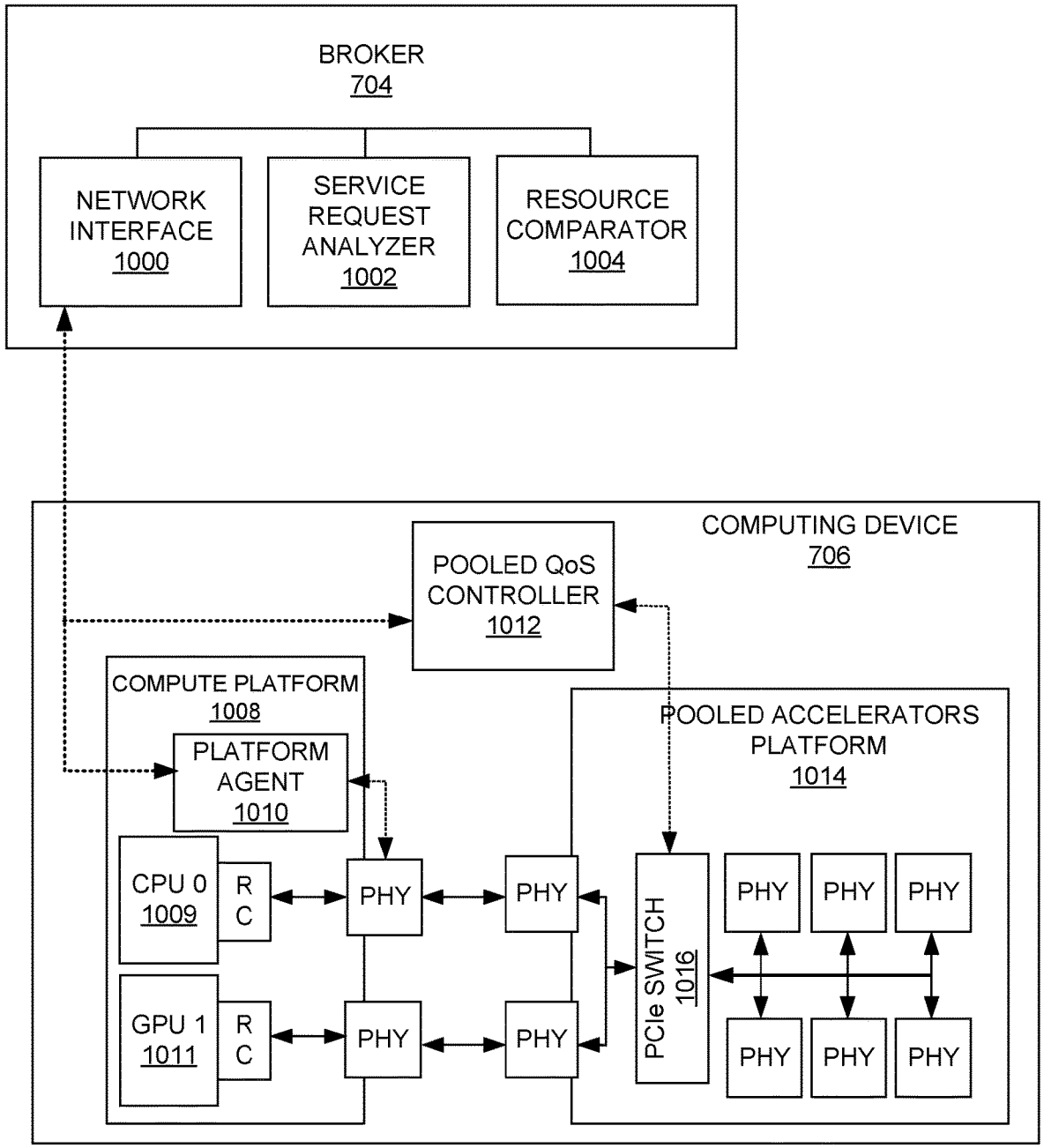

FIG. 10B is a block diagram of an example implementation of the example broker 704 and the example computing device 706 of FIG. 1. The example broker 704 of FIG. 10B includes an example network interface 1000, an example service request analyzer 1002, and an example resource comparator 1004. The example computing device 706 of FIG. 10B includes an example compute platform 1008, an example CPU 1009, an example GPU 1011, an example platform agent 1010, an example pooled QoS controller 1012, an example pooled accelerator platform 1014, and an example PCIe switch 1016. The example computing device 706 may additionally or alternatively include any of the example components illustrated in FIGS. 8 and/or 9. In some examples, the compute platform 1008 and the example pooled accelerators platform 1014 may be included in the hardware components 810 and/or the hardware components 924.

The example compute platform 1008 of FIG. 10B includes the example CPU 109 and the example GPU 1011 as the processor resources to perform tasks. Accordingly, the example compute platform 1008 includes a hybrid structure. The example GPU 1011 is a GPU hardware (HW) or GPU platform. Although the example compute platform 1008 includes example CPU 109 and the example GPU 1011, the compute platform 1008 may include any number of CPUs and/or GPUs.

Figure 10C:
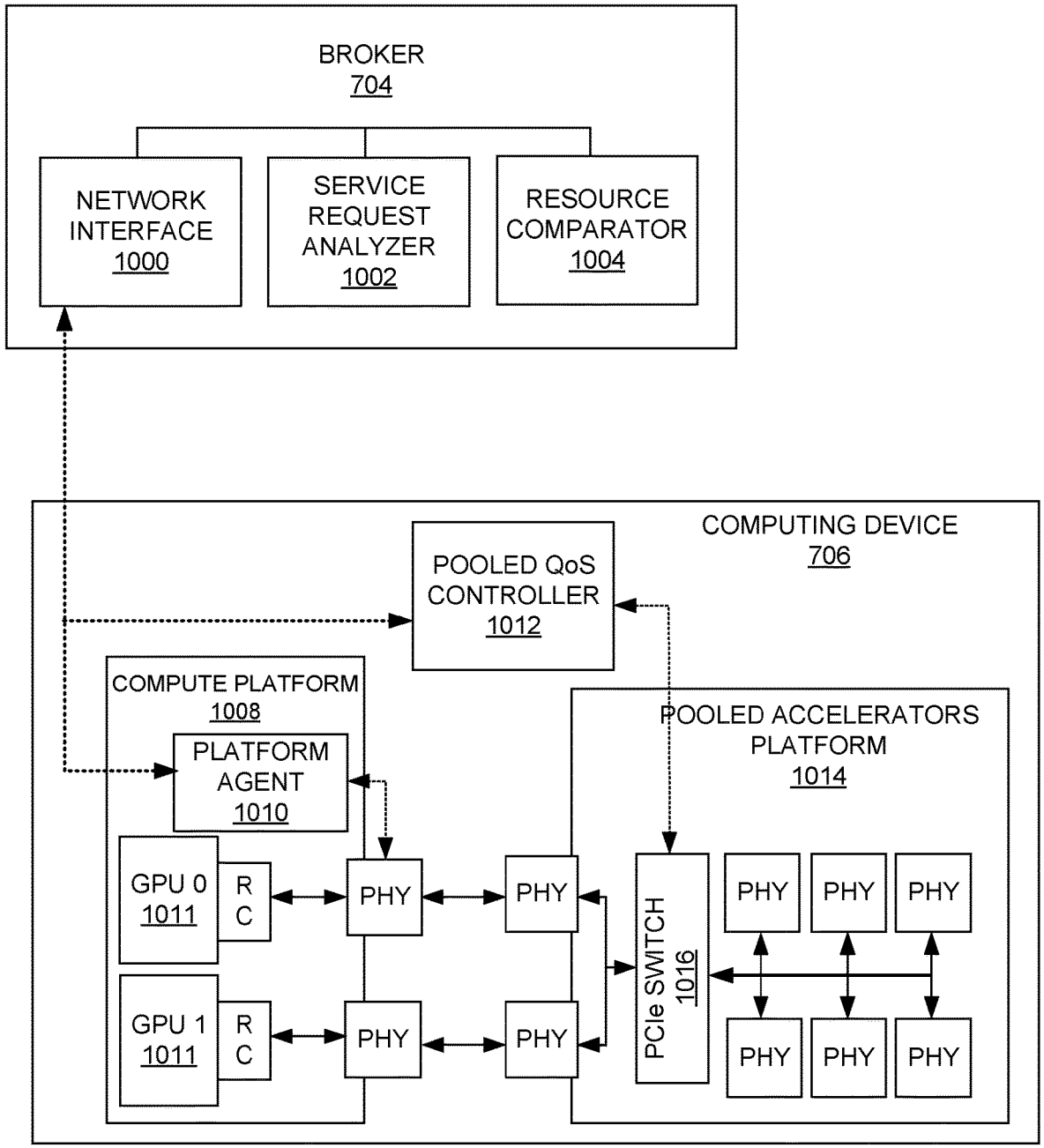

FIG. 10C is a block diagram of an example implementation of the example broker 704 and the example computing device 706 of FIG. 1. The example broker 704 of FIG. 10C includes an example network interface 1000, an example service request analyzer 1002, and an example resource comparator 1004. The example computing device 706 of FIG. 10C includes an example compute platform 1008, example GPUs 1011, an example platform agent 1010, an example pooled QoS controller 1012, an example pooled accelerator platform 1014, and an example PCIe switch 1016. The example computing device 706 may additionally or alternatively include any of the example components illustrated in FIGS. 8 and/or 9. In some examples, the compute platform 1008 and the example pooled accelerators platform 1014 may be included in the hardware components 810 and/or the hardware components 924.

The example compute platform 1008 of FIG. 10C includes the example GPUs 1011 as the processor resources to perform tasks. Accordingly, the example compute platform 1008 includes a pure GPU structure. The example GPUs 1011 are GPU hardware (HW) or GPU platforms. Although the example compute platform 1008 includes the example GPUs 1011, the compute platform 1008 may include any number of GPUs.

While an example manner of implementing the example broker 704 and/or the example computing device 708 of FIG. 7 is illustrated in FIG. 1, one or more of the elements, processes and/or devices illustrated in FIGS. 8, 9, and/or 10 may be combined, divided, re-arranged, omitted, eliminated and/or implemented in any other way. Further, the example network interface 1000, the example service request analyzer 1002, the example resource comparator 1004, and/or, more generally, the example broker 704 of FIG. 7 and/or 10 and/or the mesh proxies 804, 806, 908, 910, 912, the example OSs 808, 922, the example soft QoS mesh network 914, the example interface 916, the example hierarchy generator 918, the example load balancer 920, the example pooled QoS controller 1012, and/or, more generally, the computing device 708 of FIGS. 7-10C may be implemented by hardware, software, firmware and/or any combination of hardware, software and/or firmware. Thus, for example, any of the example network interface 1000, the example service request analyzer 1002, the example resource comparator 1004, and/or, more generally, the example broker 704 of FIGS. 7 and/or 10 and/or the mesh proxies 804, 806, 908, 910, 912, the example OSs 808, 922, the example soft QoS mesh network 914, the example interface 916, the example hierarchy generator 918, the example load balancer 920, the example pooled QoS controller 1012, and/or, more generally, the computing device 708 of FIGS. 7-10C could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, the example network interface 1000, the example service request analyzer 1002, the example resource comparator 1004, and/or, more generally, the example broker 704 of FIGS. 7 and/or 10 and/or the mesh proxies 804, 806, 908, 910, 912, the example OSs 808, 922, the example soft QoS mesh network 914, the example interface 916, the example hierarchy generator 918, the example load balancer 920, the example pooled QoS controller 1012, and/or, more generally, the computing device 708 of FIGS. 7-10C is/are hereby expressly defined to include a non-transitory computer readable storage device or storage disk such as a memory, a digital versatile disk (DVD), a compact disk (CD), a Blu-ray disk, etc. including the software and/or firmware. Further still, the example broker 704 and/or the computing device 708 of FIGS. 7, 8, 9, and/or 10 may include one or more elements, processes and/or devices in addition to, or instead of, those illustrated in FIGS. 7, 8, 9, and/or 10, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 11:
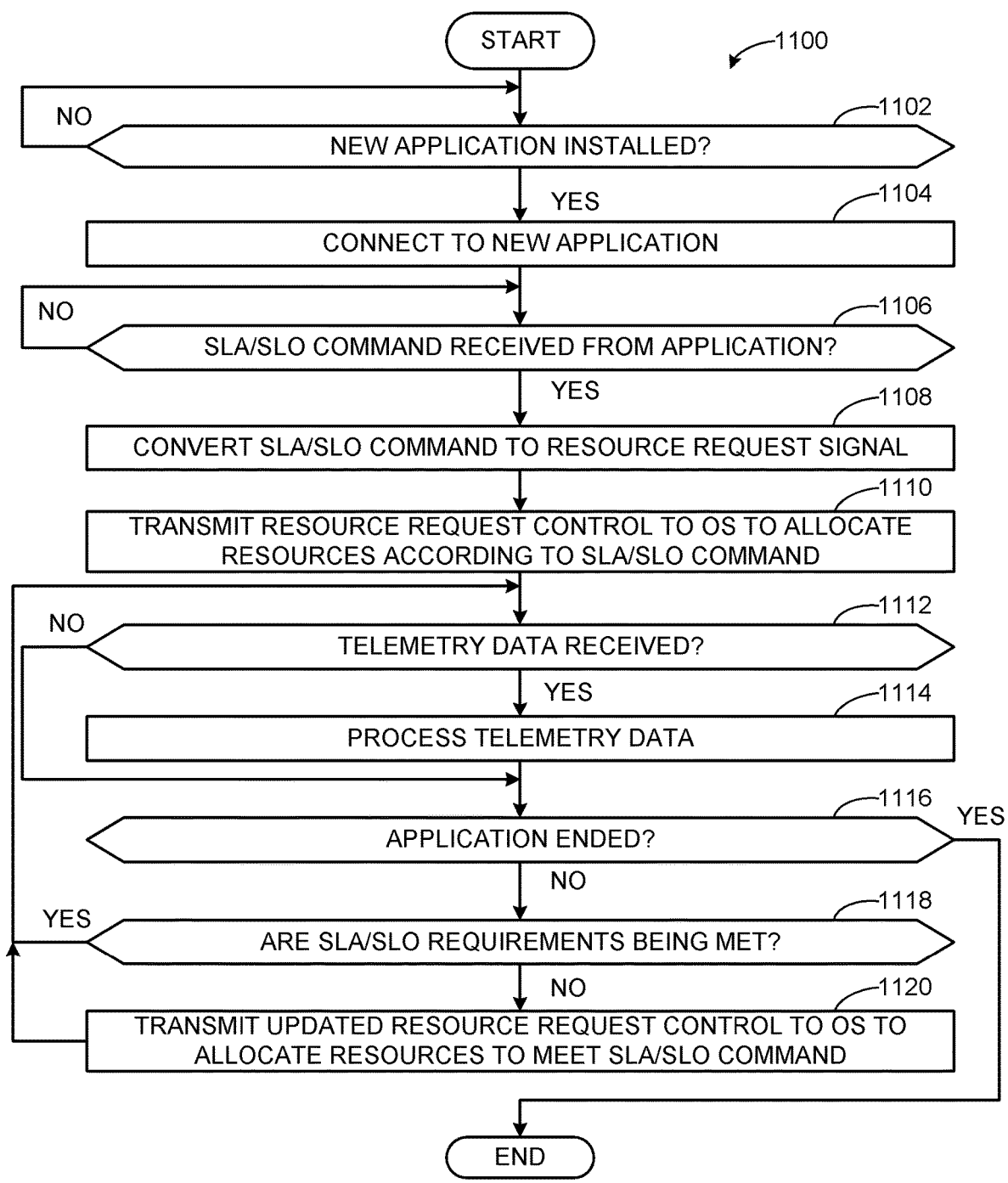
FIG. 11 illustrates a flowchart representative of example machine readable instructions that may be executed to implement the mesh proxy of FIG. 8.
Figure 12:
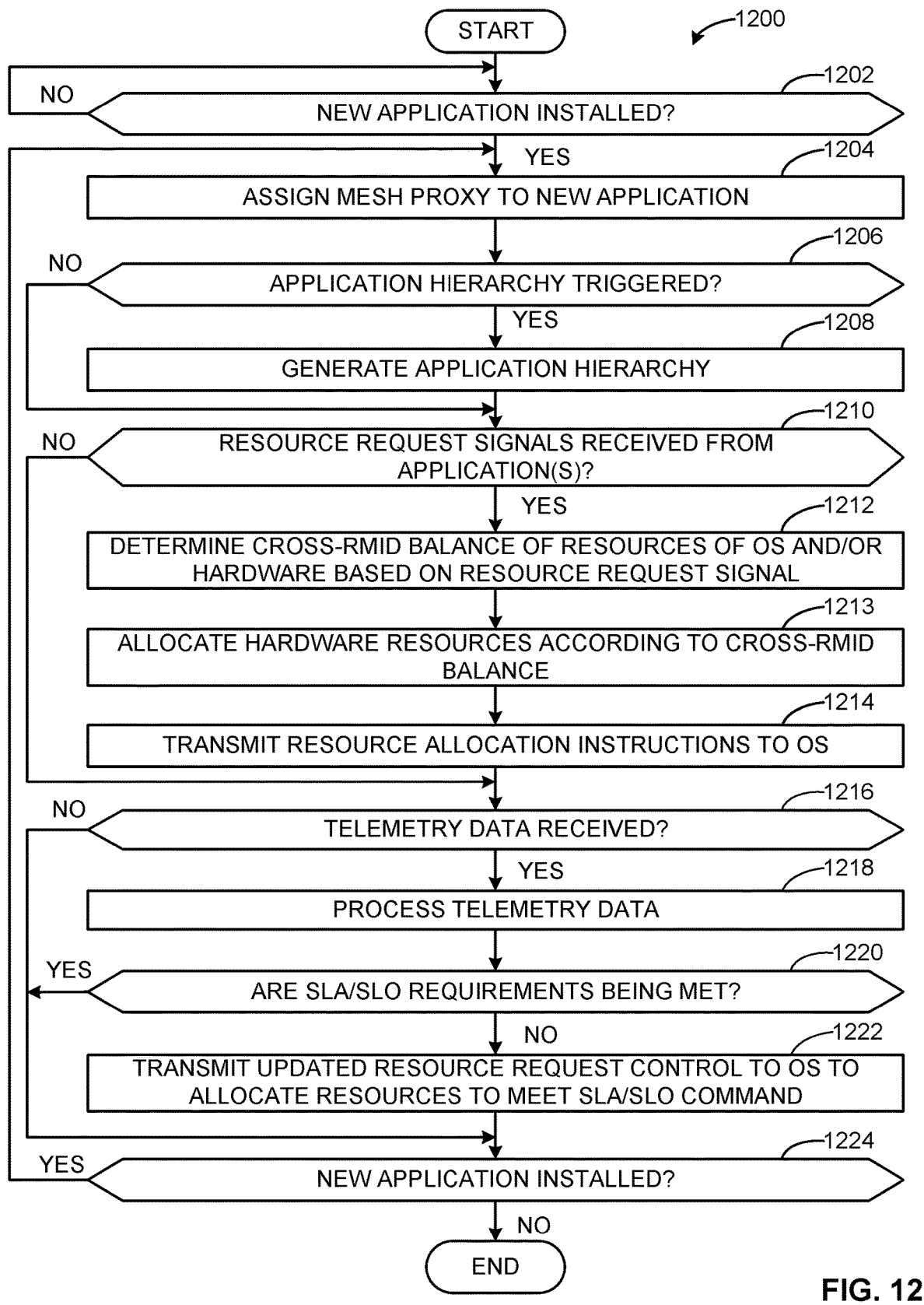
FIG. 12 illustrates a flowchart representative of example machine readable instructions that may be executed to implement the soft QoS mesh proxy of FIG. 9.
Figure 13:
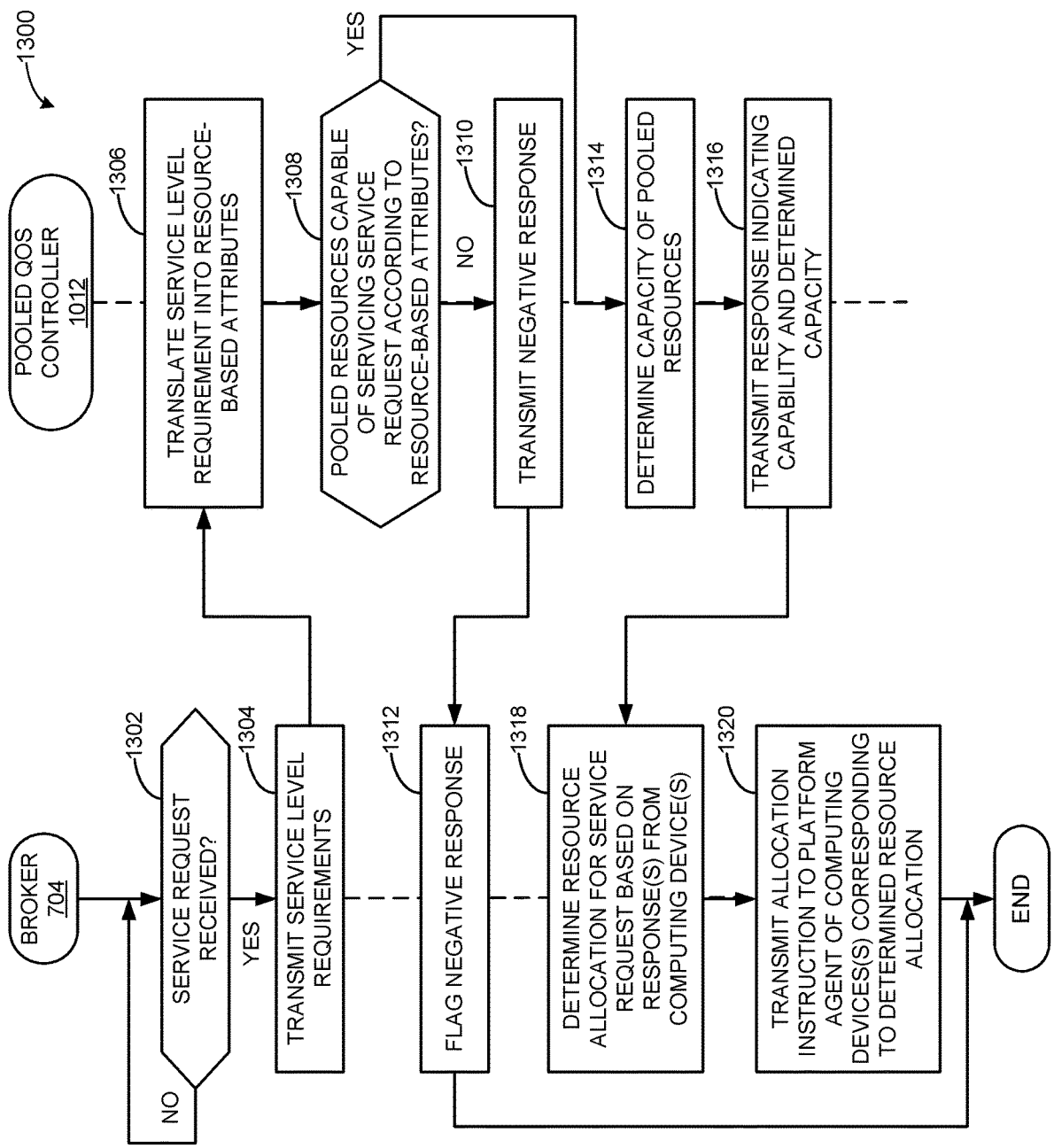
FIG. 13 illustrates a flowchart representative of example machine readable instructions that may be executed to implement the broker and the pooled QoS controller of FIG. 10A.

Flowcharts representative of example hardware logic, machine readable instructions, hardware implemented state machines, and/or any combination thereof for implementing the example broker 704 and/or the computing device 708 of FIGS. 7, 8, 9, and/or 10 are shown in FIGS. 11-13. The machine readable instructions may be one or more executable programs or portion(s) of one or more executable programs for execution by a computer processor such as the processor 1452, 1552 shown in the example processor platform 1450, 1550 discussed below in connection with FIGS. 14B and/or 15. The programs may be embodied in software stored on a non-transitory computer readable storage medium such as a CD-ROM, a floppy disk, a hard drive, a DVD, a Blu-ray disk, or a memory associated with the processor 1452, 1552 but the entirety of the programs and/or parts thereof could alternatively be executed by a device other than the processor 1452, 1552 and/or embodied in firmware or dedicated hardware. Further, although the example program(s) is/are described with reference to the flowcharts illustrated in FIGS. 11-13, many other methods of implementing the example broker 704 and/or the computing device 708 of FIGS. 7, 8, 9, and/or 10 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example programs of FIGS. 11-13 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B.

Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 11 illustrates a flowchart representative of example machine readable instructions 1100 that may be executed to implement the example mesh proxy 804 (FIG. 8) to manage QoS based on SLAs in the computing device 706 (FIGS. 7-9). Although the flowchart of FIG. 11 is described in conjunction with the computing device 706 of FIGS. 7-9, the example instructions may be used to implement other type(s) of computing devices(s) (e.g., virtual machines, services, etc.). Additionally, although the instructions 1100 of FIG. 11 are described in conjunction with the mesh proxy 804, the instructions can be performed by one or more of the mesh proxies 804, 806, 908, 910, 912 based on SLA/SLO instructions from one or more of the applications 800, 802, 902, 904, 906 (e.g., in parallel or otherwise).

At block 1102, the example mesh proxy 804 (FIG. 8) determines if a new application (e.g., the example application 800 (FIG. 8)) is installed on the example computing device 706. The example application 800 may be downloaded, installed, and/or received from the example cloud/data center 701 of FIG. 1. The example mesh proxy 804 determines if a new application is installed based on a signal from the OS 808 (FIG. 8). If the example mesh proxy 804 determines that a new application is not installed (block 1102: NO), control returns to block 1102 until a new application is installed. If the example mesh proxy 804 determines that the new application 800 is installed (block 1102: YES), the mesh proxy 804 connects to the new application 800 (e.g., when the OS 808 assigns the mesh proxy 804 to the application 800) (block 1104).

At block 1106, the example mesh proxy 804 determines if a SLA/SLO command has been obtained from the application 800. For example, the SLA/SLO command includes a requirement (e.g., bandwidth requirement, jitter requirement, latency requirement, speed requirement, etc.) for the OS 808 and/or hardware components 810 (FIG. 8) when executing the instructions of the application 800. If the example mesh proxy 804 determines that a SLA/SLO command has not been obtained from the application 800 (block 1106: NO), control returns to block 1106 until a SLO/SLA command is received. If the example mesh proxy 804 determines that a SLA/SLO command has been obtained from the application 800 (block 1106: YES), the example mesh proxy 804 converts the SLA/SLO command into a resource request signal (e.g., a RDT control signal) (block 1108). The example mesh proxy 804 converts the SLA/SLO command into a RDT control signal by translating the command into resource-based attributes and generating the RDT control signal to include the resource-based attributes. Thus, the RDT control signal includes information corresponding to the amount and/or characteristics of the OS 808 and/or the hardware components 810 necessary to achieve the SLA/SLO requirements.

At block 1110, the example mesh proxy 804 transmits the resource request signal (e.g., the RDT control signal) to the OS 808 to allocate resources (e.g., resources of the OS 808 and/or the hardware components 810) according to the SLA/SLO command (e.g., to satisfy the SLA/SLO requirements). At block 1112, the example mesh proxy 804 determines if telemetry data has been received from the OS 808. The telemetry data corresponds to performance of the OS 808 and/or hardware components 810. In this manner, the mesh proxy and/or the application 800 can monitor compliance with the SLA/SLO. If the example mesh proxy 804 determines that telemetry data has not been received (block 1112: NO), the instructions ends. If the example mesh proxy 804 determines that telemetry data has been received (block 1112: YES), the example mesh proxy 804 processes the telemetry data (block 1114). For example, the mesh proxy 804 may process the telemetry data by determining if the telemetry data satisfies the SLA/SLO requirements and/or may transmit the telemetry data to the application 800, as further described below. In some examples, the mesh proxy 804 transmits an indication to the application 800 whether the computing device 706 is in compliance with the SLO/SLA requirements.

At block 1116, the example mesh proxy 804 determines if the application 800 has ended (e.g., terminated or suspended in the computing device 706). If the example mesh proxy 804 determines that the application 800 has ended (block 1116: YES), the instructions end. If the example mesh proxy 804 determines that the application 800 has not ended (block 1116: NO), the example mesh proxy 804 determines if the SLA and/or SLO requirements are being met based on the processed telemetry data (block 1118). If the mesh proxy 804 determines that the SLA and/or SLO requirements are being met (block 1118: YES), control returns to block 112. If the mesh proxy 804 determines that the SLA and/or SLO requirements are not being met (block 1118: NO), the example mesh proxy 804 transmits an updated resource request control to the OS 808 to allocate resources to meet the SLA and/or SLO requirements (block 1120) and control returns to block 1112.

FIG. 12 illustrates a flowchart representative of example machine readable instructions 1200 that may be executed to implement the example soft QoS mesh network 914 of FIG. 9 to manage QoS with respect to SLAs from multiple applications in the computing device 706. Although the flowchart of FIG. 12 is described in conjunction with the computing device 706 of FIG. 9, the example instruction of FIG. 12 may be used to implement other type(s) of computing devices(s) (e.g., virtual machines, services, etc.).

At block 1202, the example load balancer 920 (FIG. 9) determines if a new application (e.g., one of the example application 902, 904, 906 (FIG. 9)) is installed on the example computing device 706. The application 902 may be downloaded, installed, and/or received from the example cloud/data center 701 of FIG. 1. The example load balancer 920 determines if a new application is installed based on a signal from the OS 922 (FIG. 9). If the example load balancer 920 determines that a new application is not installed (block 1202: NO), control returns to block 1202 until a new application is installed. If the example load balancer 920 determines that a new application is installed (block 1202: YES), the load balancer 920 assigns a mesh proxy (e.g., the mesh proxy 908 of FIG. 9) to the new application (e.g., the application 902 of FIG. 9) (block 1204).

At block 1206, the example hierarchy generator 918 (FIG. 9) determines if an application-based hierarchy is triggered. An application-based hierarchy may be generated when one or more of the applications 902, 904, 906 are considered high priority. The example applications 902, 904, 906 may include a priority status as part of a SLA/SLO agreement, and/or a user and/or manufacturer may select the priority status of the applications 902, 904, 906. If the example hierarchy generator 918 determines that an application hierarchy has not been triggered (block 1206: NO), control continues to block 1210. If the example hierarchy generator 918 determines that an application hierarchy has been triggered (block 1206: YES), the example hierarchy generator 918 generates an application hierarchy (block 1208).

The example hierarchy generator 918 may structure the hierarchy to any structure (e.g., any number of tiers with any number of applications per tier/group) based on the priority status or instructions. For example, the hierarchy generator 818 may assign five applications to hierarchical resource manager identifiers (RMIDs) so that the resources are controlled hierarchically through a hierarchy of the RMIDs. For example, application 1 and application 8 may share an ancestor RMID Rx with a resource allocation of X, and applications 9, 11, and 12 may share an ancestor RMID Ry with resource application of Y, and the collection of all 11 applications 1, 8, 9, 10, 11 may share a common ancestor RMID Rz with a resource allocation of Z. In such an example, within the allocation Z given to Rz, sub allocations X' and Y' may be given to Rx and Ry. Rx and Ry may add up to resource requirement that exceeds Rz, yet the platform may divide Z into allocations X' for Rx and Y' for Ry to ratios (e.g., $X'=Z*X/(X+Y)$ and $Y'=Z*Y/(X+Y)$. Alternatively, different ways of dividing Z among the component RMIDs X and Y may be formulated and controlled by another policy. This permits the hardware components 924 and the OS 922 to automatically adjust the allocation of resources (e.g., processor frequencies, memory bandwidths, cache capacities, PCIe throughputs, etc.) according to such an example compound RMID hierarchy and associated collective resource allocations, while the mesh proxies 908, 910, 912 periodically instruct the hardware components 924 and the OS 922 with additional updates.

At block 1210, the example load balancer 920 determines if the interface 916 (FIG. 9) received one or more resource request signals (e.g., RDT control signal(s)) from the mesh proxies 908, 910, 912. If the example load balancer 920 determines that the interface 916 has not obtained one or more resource request signals (block 1210: NO), control continues to block 1216. If the example load balancer 920 determines that the interface 916 has obtained one or more resource request signals (block 1210: YES), the example load balancer 920 determines a cross-RMID (e.g., cross-application) balance of the resources of the OS 922 and/or hardware components 924 based on the resource request signals (e.g., the RDT control signal(s)) from the mesh proxy(ies) 908, 910, 912 (block 1212). For example, the load balancer 920 balances the SLA/SLO requirements of the applications 902, 904, 906 giving priority to certain applications as part of the hierarchy, if any. At block 1214, the example interface 916 transmits resource allocation instructions to the OS 922 according to the cross-RMID balance.

At block 1216, the example load balancer 920 determines if telemetry data has been received from the OS 808 via the interface 916. The telemetry data corresponds to performance of the OS 808 and/or hardware components 810. In this manner, the example load balancer 920, the example mesh proxy 908 and/or the example application 902 can monitor compliance with the SLA/SLO. If the example load balancer 920 determines that telemetry data has not been received (block 1216: NO), control continues to block 1220. If the example load balancer 920 determines that telemetry data has been received (block 1216: YES), the example load balancer 920 processes the telemetry data (block 1218). The example load balancer 920 may process the telemetry data by determining if the telemetry data satisfies the SLA/SLO requirements and/or may transmit the telemetry data to the mesh proxy 908. In some examples, the load balancer 920 transmits an indication to the mesh proxy 908 whether the computing device 706 is in compliance with the SLO/SLA requirements.

At block 1220, the example load balancer 920 determines if the SLA and/or SLO requirements are being met based on the processed telemetry data. If the load balancer 920 determines that the SLA and/or SLO requirements are being met (block 1120: YES), control continues to block 1224. If the load balancer 920 determines that the SLA and/or SLO requirements are not being met (block 1120: NO), the example load balancer 920 transmits an updated resource request control to the OS 922 to allocate resources to meet the SLA and/or SLO requirements (block 1222).

At block 1224, the example load balancer 920 determines if a new application has been installed. If the example load balancer 920 determines that a new application has been installed (block 1224: YES), control returns to block 1204. If the example load balancer 920 determines that a new application has not been installed (block 1224: NO), the instructions end.

FIG. 13 illustrates a flowchart representative of example machine readable instructions 1300 that may be executed to implement the example broker 704 (FIGS. 7 and 10) and the example pooled QoS controller 1012 (FIG. 10A) to manage QoS based on SLAs for pooled resources in the computing device 706. Although the flowchart of FIG. 13 is described in conjunction with the computing device 706 of FIG. 10A, the example instructions may be used to implement other type(s) of computing devices(s) (e.g., virtual machines, services, etc.).

At block 1302, the example interface 1000 (FIG. 10A) of the broker 704 determines if a service request has been received. A service request may correspond to an instruction to perform one or more tasks. The service request may be sent from another computing device from the same domain 703 (e.g., inter domain) or a different domain (e.g., from another broker, a computing device from another domain, and/or the cloud/data center 701 of FIG. 1). If the interface 1000 determines that a service request has not been received (block 1302: NO), control returns to block 1302 until a service request is received. If the interface 1000 determines that a service request has been received (block 1302: YES), the example service request analyzer 1002 transmits the SLA/SLO requirements (e.g., extracted from or as part of the service request) to the example pooled QoS controller 1012 (block 1304). As described above, the example service request analyzer 1002 (FIG. 10A) may process the service request to determine the SLA/SLO requirements of the service request and convert the requirements into an amount of pooled resources and/or characteristics of the pooled resources and transmit the amount of pooled resources and/or pooled resource characteristics to the pooled QoS controller 1012. Additionally or alternatively, the example service request analyzer 1002 may send a request for pooled resource characteristics and/or pooled resource availability. In this manner, the example resource comparator 1004 can determine whether the computing device 706 has sufficient resources to service the request according to the SLA/SLO requirements locally at the broker 704.

At block 1306, the example pooled QoS controller 1012 translates the service level requirements into resource resource-based attributes. For example, if the service request includes a SLO that corresponds to a particular latency requirement, the pooled QoS controller 1012 converts the latency requirement into the amount and/or type of resource needed to satisfy the latency requirement. At block 1308, the example pooled QoS controller 1012 determines if the pooled resources (e.g., from the pooled accelerators platform 1014) are capable of servicing the service request according to the resource-based attributes (e.g., based on the characteristics of the resources at the computing device 106). For example, if the service request corresponds to latency, the pooled QoS controller 1012 determines whether the pooled resources are capable of performing according to the required latency.

If the example pooled QoS controller 1012 determines that the pooled resources are not capable of operating according to the service request (block 1308: NO), the example pooled QoS controller 1012 transmits a negative response to the example broker 704 indicating that the computing device 706 has insufficient resources to fulfill the service request according to the requirements (block 1310). At block 1312, the example resource comparator 1004 (FIG. 10A) flags the negative response. In some examples, the network interface 1000 may transmit the flagged negative response to a monitoring device that monitors the computing device 706 (e.g., the cloud/data center 701 of FIG. 1). In this manner, the monitoring device can potentially update the pooled resources at the computing device 706 and/or suggest updating the pooled resources at the computing device 706 to an administrator. After block 1312, the instructions end.

If the example pooled QoS controller 1012 determines that the pooled resources are capable of operating according to the service request (block 1308: YES), the example pooled QoS controller 1012 determines the capacity of the pooled resources (block 1314). For example, the pooled resources of the computing device 706 may be structurally (e.g., resource capability) capable of satisfying a SLA/SLO requirement, but may not have capacity (e.g., resource capacity) to satisfy a SLA/SLO requirement because the pooled resources are unavailable (e.g., being used by the computing device 106). Accordingly, the pooled QoS controller 1012 determines how much of the pooled resources are unused and/or otherwise available for use to determine the capacity of the pooled resources.

At block 1316, the example pooled QoS controller 1012 transmits a response to the broker 704 indicating the capability and the determined capacity of the pooled resources of the computing device 706. The response may include an indication of the whether the pooled resources have the structural capability and sufficient capacity to service the request. The response may also include the determined capacity. In this manner, if the pooled resources have the structural capability but do not have enough capacity to service the entire request, the broker 704 can transmit instructions to perform part of the service request based on the determined capacity.

At block 1318, the example resource comparator 1004 determines a resource allocation for the service request based on the response(s) from the computing devices 706, 708 and/or any other computing devices in the domain 703 (FIG. 1). For example, the resource comparator 1004 may determine that the service request should be allocated to one of the computing devices 706, 708 or split among the two computing devices 706, 708 based on the capabilities and/or capacity of the pooled resources of the two computing devices 706, 708. At block 1320, the example network interface 1000 transmits the allocation instructions to the platform agent 1010 of the computing devices that correspond to the determined resource allocation. Transmitting the allocation instructions informs the computing devices which parts of the service requests to execute. After block 1320, the instructions end.

Figure 14A:
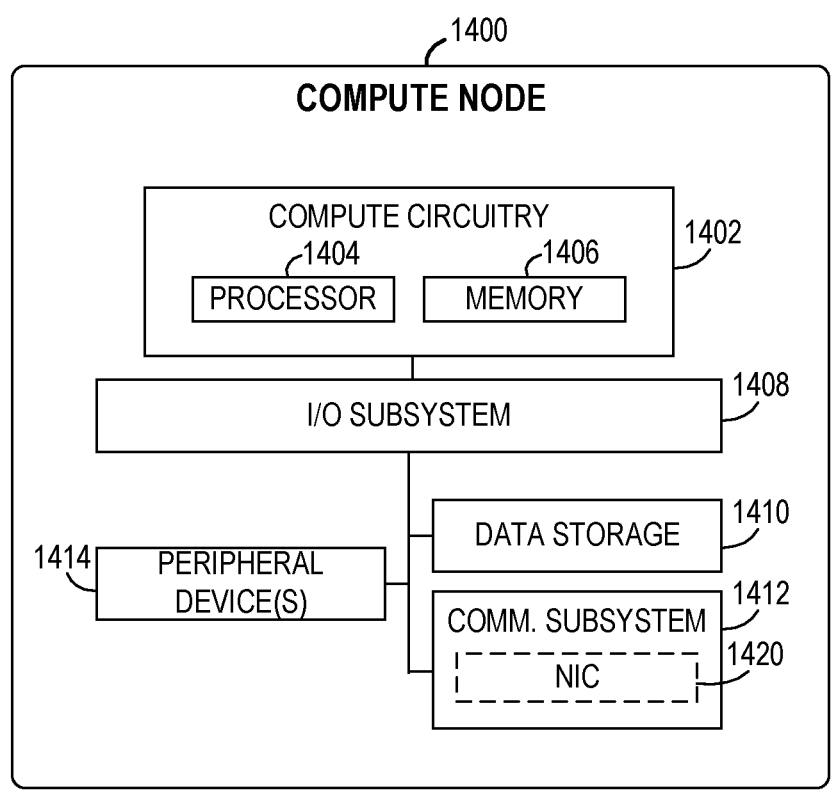
FIG. 14A is a block diagram of an example implementation of an example compute node that may be deployed in one of the edge computing systems illustrated in FIGS. 1-4 and 6-10C.

FIG. 14A is a block diagram of an example implementation of an example edge compute node 1400 that includes a compute engine (also referred to herein as "compute circuitry") 1402, an input/output (I/O) subsystem 1408, data storage 1410, a communication circuitry subsystem 1412, and, optionally, one or more peripheral devices 1414. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component. The example edge compute node 1400 of FIG. 14 may be deployed in one of the edge computing systems illustrated in FIGS. 1-4 and/or 6-10C to implement any edge compute node of FIGS. 1-4 and/or 6-10C. The example edge compute node 1400 may additionally or alternatively include any of the components of the computing device 706 of FIGS. 7-10C.

The example compute node 1400 may be embodied as any type of engine, device, or collection of devices capable of performing various compute functions. In some examples, the compute node 1400 may be embodied as a single device such as an integrated circuit, an embedded system, a field-programmable gate array (FPGA), a system-on-a-chip (SOC), or other integrated system or device. In the illustrative example, the compute node 1400 includes or is embodied as a processor 1404 and a memory 1406. The example processor 1404 may be embodied as any type of processor capable of performing the functions described herein (e.g., executing an application). For example, the processor 1404 may be embodied as a multi-core processor(s), a microcontroller, a processing unit, a specialized or special purpose processing unit, or other processor or processing/controlling circuit.

In some examples, the processor 1404 may be embodied as, include, or be coupled to an FPGA, an application specific integrated circuit (ASIC), reconfigurable hardware or hardware circuitry, or other specialized hardware to facilitate performance of the functions described herein. Also in some examples, the processor 1404 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC), acceleration circuitry, storage devices, or AI hardware (e.g., GPUs or programmed FPGAs). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU and/or GPU or general purpose processing hardware. However, it will be understood that a xPU, a SOC, a CPU, a GPU and other variations of the processor 1404 may work in coordination with each other to execute many types of operations and instructions within and on behalf of the compute node 1400.

The example memory 1406 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device 1406 is a block addressable memory device, such as those based on NAND or NOR technologies. A memory device 1406 may also include a three dimensional crosspoint memory device (e.g., Intel® 3D XPoint™ memory), or other byte addressable write-in-place nonvolatile memory devices. The memory device 1406 may refer to the die itself and/or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the memory 1406 may be integrated into the processor 1404. The memory 1406 may store various software and data used during operation such as one or more applications, data operated on by the application(s), libraries, and drivers.

The example compute circuitry 1402 is communicatively coupled to other components of the compute node 1400 via the I/O subsystem 1408, which may be embodied as circuitry and/or components to facilitate input/output operations with the compute circuitry 1402 (e.g., with the processor 1404 and/or the main memory 1406) and other components of the compute circuitry 1402. For example, the I/O subsystem 1408 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 1408 may form a portion of a system-on-a-chip (SoC) and be incorporated, along with one or more of the processor 1404, the memory 1406, and other components of the compute circuitry 1402, into the compute circuitry 1402.

The one or more illustrative data storage devices 1410 may be embodied as any type of devices configured for short-term or long-term storage of data such as, for example, memory devices and circuits, memory cards, hard disk drives, solid-state drives, or other data storage devices. Individual data storage devices 1410 may include a system partition that stores data and firmware code for the data storage device 1410. Individual data storage devices 1410 may also include one or more operating system partitions that store data files and executables for operating systems depending on, for example, the type of compute node 1400.

The example communication circuitry 1412 may be embodied as any communication circuit, device, or collection thereof, capable of enabling communications over a network between the compute circuitry 1402 and another compute device (e.g., an edge gateway of an implementing edge computing system). The example communication circuitry 1412 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LP-WAN) or low-power wide-area (LPWA) protocols, etc.) to effect such communication.

The illustrative communication circuitry 1412 includes a network interface controller (NIC) 1420, which may also be referred to as a host fabric interface (HFI). The example NIC 1420 may be embodied as one or more add-in-boards, daughter cards, network interface cards, controller chips, chipsets, or other devices that may be used by the compute node 1400 to connect with another compute device (e.g., an edge gateway node). In some examples, the NIC 1420 may be embodied as part of a system-on-a-chip (SoC) that includes one or more processors, or included on a multichip package that also contains one or more processors. In some examples, the NIC 1420 may include a local processor (not shown) and/or a local memory (not shown) that are both local to the NIC 1420. In such examples, the local processor of the NIC 1420 may be capable of performing one or more of the functions of the compute circuitry 1402 described herein. Additionally, or alternatively, in such examples, the local memory of the NIC 1420 may be integrated into one or more components of the client compute node at the board level, socket level, chip level, and/or other levels.

Additionally, in some examples, a respective compute node 1400 may include one or more peripheral devices 1414. Such peripheral devices 1414 may include any type of peripheral device found in a compute device or server such as audio input devices, a display, other input/output devices, interface devices, and/or other peripheral devices, depending on the particular type of the compute node 1400. In further examples, the compute node 1400 may be embodied by a respective edge compute node (whether a client, gateway, or aggregation node) in an edge computing system or like forms of appliances, computers, subsystems, circuitry, or other components.

Figure 14B:
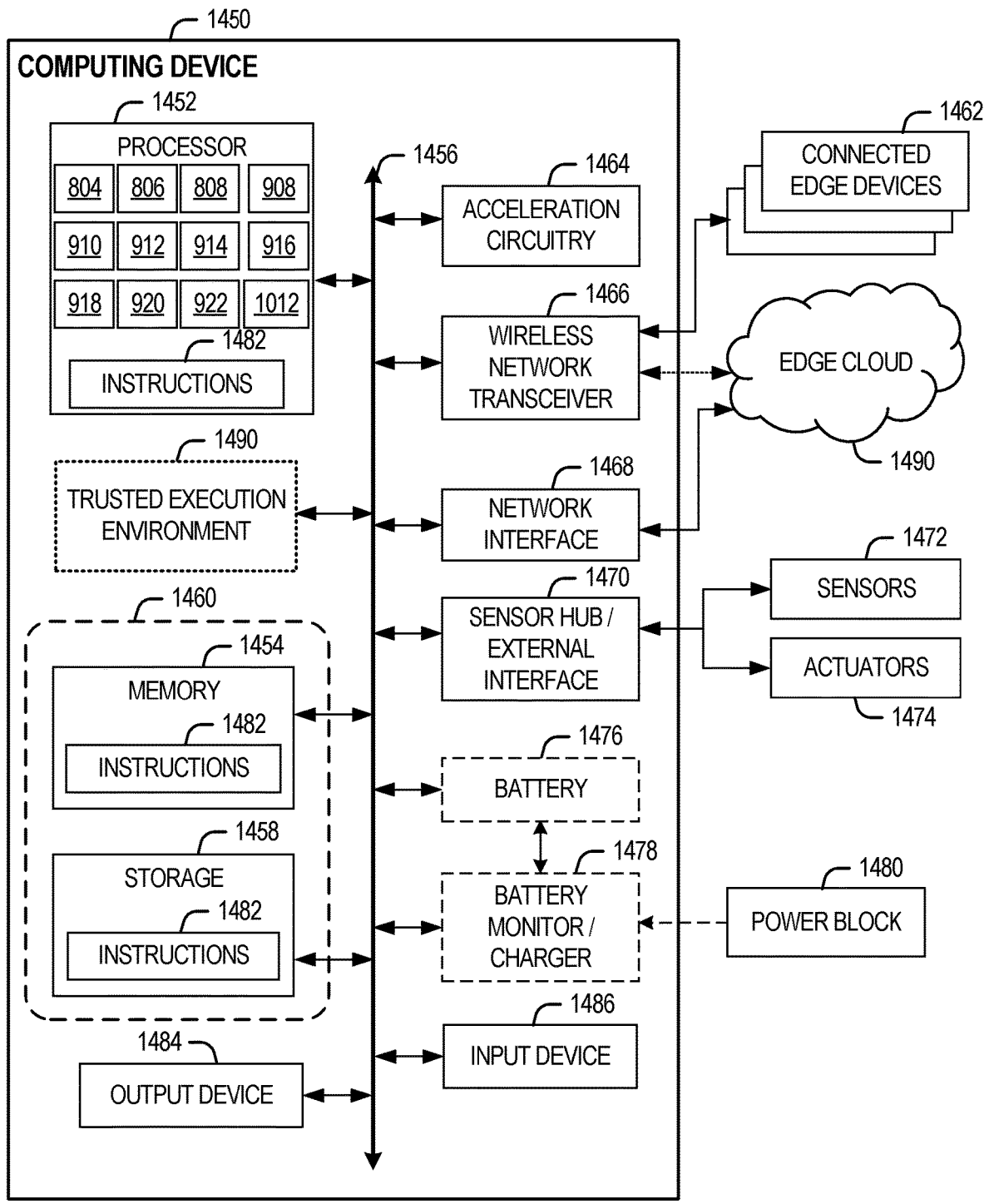
FIG. 14B is a block diagram of an example processor platform structured to execute the instructions of FIGS. 11-13 to implement the mesh proxy, the soft QoS controller, and/or the pooled QoS controller of FIGS. 8-10C.

In a more detailed example, FIG. 14B illustrates a block diagram of an example may computing device 1450 structured to execute the instructions of FIGS. 11-13 to implement the techniques (e.g., operations, processes, methods, and methodologies) described herein such as the computing device 708 of FIGS. 7-10C. This computing device 1450 provides a closer view of the respective components of node 1400 when implemented as or as part of a computing device (e.g., as a mobile device, a base station, server, gateway, etc.). The computing device 1450 may include any combinations of the hardware or logical components referenced herein, and it may include or couple with any device usable with an edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the computing device 1450, or as components otherwise incorporated within a chassis of a larger system. For example, the computing device 1450 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, an Internet of Things (IoT) device, or any other type of computing device.

The edge computing device 1450 may include processing circuitry in the form of a processor 1452, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 1452 may be a part of a system on a chip (SoC) in which the processor 1452 and other components are formed into a single integrated circuit, or a single package, such as the Edison™ or Galileo™ SoC boards from Intel Corporation, Santa Clara, California. As an example, the processor 1452 may include an Intel® Architecture Core™ based CPU processor, such as a Quark™, an Atom™, an i3, an i5, an i14, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 1452 and accompanying circuitry may be provided in a single socket form factor, multiple socket form factor, or a variety of other formats, including in limited hardware configurations or configurations that include fewer than all elements shown in FIG. 14B. In this example, the processor implements the example mesh proxies 804, 806, 908, 910, 912, the example OSs 808, 922, the example soft QoS mesh network 914, the example network interface 916, the example hierarchy generator 918, the example load balancer 920, and the example pooled QoS controller 1012 of FIGS. 8-10C.

The processor 1452 may communicate with a system memory 1454 over an interconnect 1456 (e.g., a bus). Any number of memory devices may be used to provide for a given amount of system memory. As examples, the memory 1454 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD149F for DDR SDRAM, JESD149-2F for DDR2 SDRAM, JESD149-3F for DDR3 SDRAM, JESD149-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q114P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1458 may also couple to the processor 1452 via the interconnect 1456. In an example, the storage 1458 may be implemented via a solid-state disk drive (SSDD). Other devices that may be used for the storage 1458 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 1458 may be on-die memory or registers associated with the processor 1452. However, in some examples, the storage 1458 may be implemented using a micro hard disk drive (HDD). Further, any number of new technologies may be used for the storage 1458 in addition to, or instead of, the technologies described, such resistance change memories, phase change memories, holographic memories, or chemical memories, among others.

The components may communicate over the interconnect 1456. The interconnect 1456 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1456 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 1456 may couple the processor 1452 to a transceiver 1466, for communications with the connected edge devices 1462. The transceiver 1466 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 1462. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 1466 (or multiple transceivers) may communicate using multiple standards or radios for communications at a different range. For example, the computing device 1450 may communicate with close devices, e.g., within about 10 meters, using a local transceiver based on Bluetooth Low Energy (BLE), or another low power radio, to save power. More distant connected edge devices 1462, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 1466 (e.g., a radio transceiver) may be included to communicate with devices or services in the edge cloud 1495 via local or wide area network protocols. The wireless network transceiver 1466 may be a low-power wide-area (LPWA) transceiver that follows the IEEE 802.15.4, or IEEE 802.15.4g standards, among others. The computing device 1450 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 1466, as described herein. For example, the transceiver 1466 may include a cellular transceiver that uses spread spectrum (SPA/SAS) communications for implementing high-speed communications. Further, any number of other protocols may be used, such as Wi-Fi® networks for medium speed communications and provision of network communications. The transceiver 1466 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 1468 may be included to provide a wired communication to nodes of the edge cloud 1495 or to other devices, such as the connected edge devices 1462 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 1468 may be included to enable connecting to a second network, for example, a first NIC 1468 providing communications to the cloud over Ethernet, and a second NIC 1468 providing communications to other devices over another type of network.

Given the variety of types of applicable communications from the device to another component or network, applicable communications circuitry used by the device may include or be embodied by any one or more of components 1464, 1466, 1468, or 1470. Accordingly, in various examples, applicable means for communicating (e.g., receiving, transmitting, etc.) may be embodied by such communications circuitry.

The computing device 1450 may include or be coupled to acceleration circuitry 1464, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific edge computing tasks for service management and service operations discussed elsewhere in this document.

The interconnect 1456 may couple the processor 1452 to a sensor hub or external interface 1470 that is used to connect additional devices or subsystems. The devices may include sensors 1472, such as accelerometers, level sensors, flow sensors, optical light sensors, camera sensors, temperature sensors, global navigation system (e.g., GPS) sensors, pressure sensors, barometric pressure sensors, and the like. The hub or interface 1470 further may be used to connect the computing device 1450 to actuators 1474, such as power switches, valve actuators, an audible sound generator, a visual warning device, and the like.

In some optional examples, various input/output (I/O) devices may be present within or connected to, the computing device 1450. For example, a display or other output device 1484 may be included to show information, such as sensor readings or actuator position. An input device 1486, such as a touch screen or keypad may be included to accept input. An output device 1484 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the computing device 1450. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 1476 may power the computing device 1450, although, in examples in which the computing device 1450 is mounted in a fixed location, it may have a power supply coupled to an electrical grid, or the battery may be used as a backup or for temporary capabilities. The battery 1476 may be a lithium ion battery, or a metal-air battery, such as a zinc-air battery, an aluminum-air battery, a lithium-air battery, and the like.

A battery monitor/charger 1478 may be included in the computing device 1450 to track the state of charge (SoCh) of the battery 1476, if included. The battery monitor/charger 1478 may be used to monitor other parameters of the battery 1476 to provide failure predictions, such as the state of health (SoH) and the state of function (SoF) of the battery 1476. The battery monitor/charger 1478 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 1478 may communicate the information on the battery 1476 to the processor 1452 over the interconnect 1456. The battery monitor/charger 1478 may also include an analog-to-digital (ADC) converter that enables the processor 1452 to directly monitor the voltage of the battery 1476 or the current flow from the battery 1476.

The battery parameters may be used to determine actions that the computing device 1450 may perform, such as transmission frequency, mesh network operation, sensing frequency, and the like.

A power block 1480, or other power supply coupled to a grid, may be coupled with the battery monitor/charger 1478 to charge the battery 1476. In some examples, the power block 1480 may be replaced with a wireless power receiver to obtain the power wirelessly, for example, through a loop antenna in the computing device 1450. A wireless battery charging circuit, such as an LTC4020 chip from Linear Technologies of Milpitas, California, among others, may be included in the battery monitor/charger 1478. The specific charging circuits may be selected based on the size of the battery 1476, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1458 may include instructions 1482 in the form of software, firmware, or hardware commands to implement the techniques described herein. Although such instructions 1482 are shown as code blocks included in the memory 1454 and the storage 1458, it may be understood that any of the code blocks may be replaced with hardwired circuits, for example, built into an application specific integrated circuit (ASIC).

In an example, the instructions 1482 provided via the memory 1454, the storage 1458, or the processor 1452 may be embodied as a non-transitory, machine-readable medium 1460 including code to direct the processor 1452 to perform electronic operations in the computing device 1450. The processor 1452 may access the non-transitory, machine-readable medium 1460 over the interconnect 1456. For instance, the non-transitory, machine-readable medium 1460 may be embodied by devices described for the storage 1458 or may include specific storage units such as optical disks, flash drives, or any number of other hardware devices. The non-transitory, machine-readable medium 1460 may include instructions to direct the processor 1452 to perform a specific sequence or flow of actions, for example, as described with respect to the flowchart(s) and block diagram(s) of operations and functionality depicted above. As used herein, the terms "machine-readable medium" and "computer-readable medium" are interchangeable.

Also in a specific example, the instructions 1482 on the processor 1452 (separately, or in combination with the instructions 1482 of the machine readable medium 1460) may configure execution or operation of a trusted execution environment (TEE) 1490. In an example, the TEE 1490 operates as a protected area accessible to the processor 1452 for secure execution of instructions and secure access to data. Various implementations of the TEE 1490, and an accompanying secure area in the processor 1452 or the memory 1454 may be provided, for instance, through use of Intel® Software Guard Extensions (SGX) or ARM® Trust-Zone® hardware security extensions, Intel® Management Engine (ME), or Intel® Converged Security Manageability Engine (CSME). Other aspects of security hardening, hardware roots-of-trust, and trusted or protected operations may be implemented in the device 1450 through the TEE 1490 and the processor 1452. As described above in conjunction with FIG. 8, the TEE 1490 may process privacy sensitive telemetry data (e.g., AI inference over telemetry data). In such examples, the TEE 1490 may ensure that the various interests (e.g., conditions) are met as a condition of acceptance and/or disclosure of the telemetry data.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., Hypertext Transfer Protocol (HTTP)).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

The machine executable instructions 1100, 1200, 1300 (1482) of FIGS. 11-13 may be stored in the memory 1554, the storage 1558, and/or on a removable non-transitory computer readable storage medium such as a CD or DVD.

Figure 15:
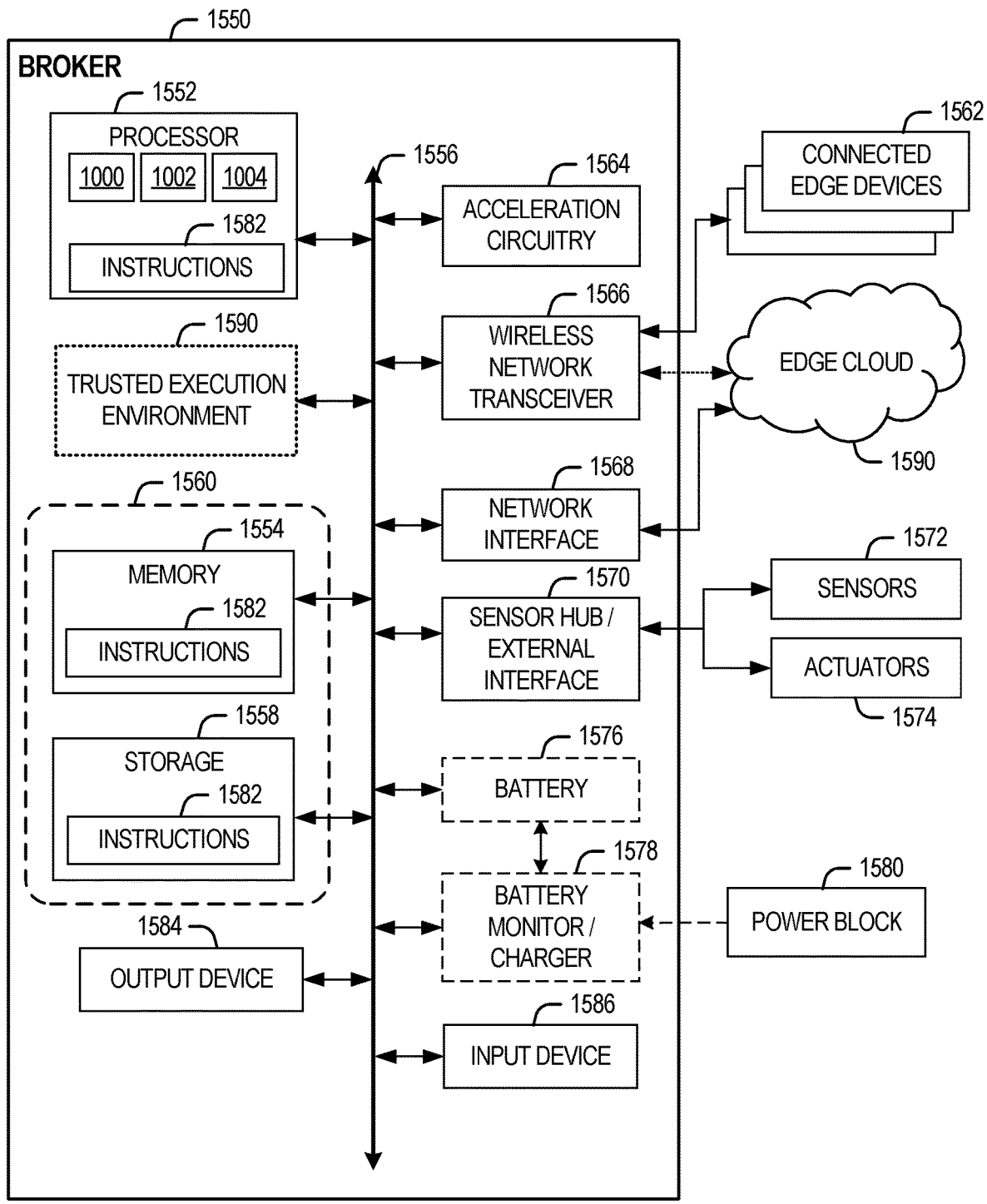
FIG. 15 is a block diagram of an example processor platform structured to execute the instructions of FIG. 13 to implement the broker of FIG. 10A.

In a more detailed example, FIG. 15 illustrates a block diagram of an example computing device 1550 structured to execute the instructions of FIG. 13 to implement the techniques (e.g., operations, processes, methods, and methodologies) described herein such as the broker 704 FIGS. 7 and/or 10. This computing device 1550 provides a closer view of the respective components of node 1500 when implemented as or as part of a computing device (e.g., as a mobile device, a base station, server, gateway, etc.). The computing device 1550 may include any combinations of the hardware or logical components referenced herein, and it may include or couple with any device usable with an edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the computing device 1550, or as components otherwise incorporated within a chassis of a larger system. For example, the computing device 1550 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, an Internet of Things (IoT) device, or any other type of computing device.

The edge computing device 1550 may include processing circuitry in the form of a processor 1552, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 1552 may be a part of a system on a chip (SoC) in which the processor 1552 and other components are formed into a single integrated circuit, or a single package, such as the Edison™ or Galileo™ SoC boards from Intel Corporation, Santa Clara, California. As an example, the processor 1552 may include an Intel® Architecture Core™ based CPU processor, such as a Quark™, an Atom™, an i3, an i5, an i14, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 1552 and accompanying circuitry may be provided in a single socket form factor, multiple socket form factor, or a variety of other formats, including in limited hardware configurations or configurations that include fewer than all elements shown in FIG. 15. In this example, the processor implements the network interface 1000, the service request analyzer 1002, and the resource comparator 1004 of FIG. 10A.

The processor 1552 may communicate with a system memory 1554 over an interconnect 1556 (e.g., a bus). Any number of memory devices may be used to provide for a given amount of system memory. As examples, the memory 1554 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD149F for DDR SDRAM, JESD149-2F for DDR2 SDRAM, JESD149-3F for DDR3 SDRAM, JESD149-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q114P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1558 may also couple to the processor 1552 via the interconnect 1556. In an example, the storage 1558 may be implemented via a solid-state disk drive (SSDD). Other devices that may be used for the storage 1558 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 1558 may be on-die memory or registers associated with the processor 1552. However, in some examples, the storage 1558 may be implemented using a micro hard disk drive (HDD). Further, any number of new technologies may be used for the storage 1558 in addition to, or instead of, the technologies described, such resistance change memories, phase change memories, holographic memories, or chemical memories, among others.

The components may communicate over the interconnect 1556. The interconnect 1556 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1556 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 1556 may couple the processor 1552 to a transceiver 1566, for communications with the connected edge devices 1562. The transceiver 1566 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 1562. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 1566 (or multiple transceivers) may communicate using multiple standards or radios for communications at a different range. For example, the computing device 1550 may communicate with close devices, e.g., within about 10 meters, using a local transceiver based on Bluetooth Low Energy (BLE), or another low power radio, to save power. More distant connected edge devices 1562, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 1566 (e.g., a radio transceiver) may be included to communicate with devices or services in the edge cloud 1595 via local or wide area network protocols. The wireless network transceiver 1566 may be a low-power wide-area (LPWA) transceiver that follows the IEEE 802.15.4, or IEEE 802.15.4g standards, among others. The computing device 1550 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 1566, as described herein. For example, the transceiver 1566 may include a cellular transceiver that uses spread spectrum (SPA/SAS) communications for implementing high-speed communications. Further, any number of other protocols may be used, such as Wi-Fi® networks for medium speed communications and provision of network communications. The transceiver 1566 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 1568 may be included to provide a wired communication to nodes of the edge cloud 1595 or to other devices, such as the connected edge devices 1562 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 1568 may be included to enable connecting to a second network, for example, a first NIC 1568 providing communications to the cloud over Ethernet, and a second NIC 1568 providing communications to other devices over another type of network.

Given the variety of types of applicable communications from the device to another component or network, applicable communications circuitry used by the device may include or be embodied by any one or more of components 1564, 1566, 1568, or 1570. Accordingly, in various examples, applicable means for communicating (e.g., receiving, transmitting, etc.) may be embodied by such communications circuitry.

The computing device 1550 may include or be coupled to acceleration circuitry 1564, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific edge computing tasks for service management and service operations discussed elsewhere in this document.

The interconnect 1556 may couple the processor 1552 to a sensor hub or external interface 1570 that is used to connect additional devices or subsystems. The devices may include sensors 1572, such as accelerometers, level sensors, flow sensors, optical light sensors, camera sensors, temperature sensors, global navigation system (e.g., GPS) sensors, pressure sensors, barometric pressure sensors, and the like. The hub or interface 1570 further may be used to connect the computing device 1550 to actuators 1574, such as power switches, valve actuators, an audible sound generator, a visual warning device, and the like.

In some optional examples, various input/output (I/O) devices may be present within or connected to, the computing device 1550. For example, a display or other output device 1584 may be included to show information, such as sensor readings or actuator position. An input device 1586, such as a touch screen or keypad may be included to accept input. An output device 1584 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the computing device 1550. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 1576 may power the computing device 1550, although, in examples in which the computing device 1550 is mounted in a fixed location, it may have a power supply coupled to an electrical grid, or the battery may be used as a backup or for temporary capabilities. The battery 1576 may be a lithium ion battery, or a metal-air battery, such as a zinc-air battery, an aluminum-air battery, a lithium-air battery, and the like.

A battery monitor/charger 1578 may be included in the computing device 1550 to track the state of charge (SoCh) of the battery 1576, if included. The battery monitor/charger 1578 may be used to monitor other parameters of the battery 1576 to provide failure predictions, such as the state of health (SoH) and the state of function (SoF) of the battery 1576. The battery monitor/charger 1578 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, TX. The battery monitor/charger 1578 may communicate the information on the battery 1576 to the processor 1552 over the interconnect 1556. The battery monitor/charger 1578 may also include an analog-to-digital (ADC) converter that enables the processor 1552 to directly monitor the voltage of the battery 1576 or the current flow from the battery 1576. The battery parameters may be used to determine actions that the computing device 1550 may perform, such as transmission frequency, mesh network operation, sensing frequency, and the like.

A power block 1580, or other power supply coupled to a grid, may be coupled with the battery monitor/charger 1578 to charge the battery 1576. In some examples, the power block 1580 may be replaced with a wireless power receiver to obtain the power wirelessly, for example, through a loop antenna in the computing device 1550. A wireless battery charging circuit, such as an LTC4020 chip from Linear Technologies of Milpitas, California, among others, may be included in the battery monitor/charger 1578. The specific charging circuits may be selected based on the size of the battery 1576, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1558 may include instructions 1582 in the form of software, firmware, or hardware commands to implement the techniques described herein. Although such instructions 1582 are shown as code blocks included in the memory 1554 and the storage 1558, it may be understood that any of the code blocks may be replaced with hardwired circuits, for example, built into an application specific integrated circuit (ASIC).

In an example, the instructions 1582 provided via the memory 1554, the storage 1558, or the processor 1552 may be embodied as a non-transitory, machine-readable medium 1560 including code to direct the processor 1552 to perform electronic operations in the computing device 1550. The processor 1552 may access the non-transitory, machine-readable medium 1560 over the interconnect 1556. For instance, the non-transitory, machine-readable medium 1560 may be embodied by devices described for the storage 1558 or may include specific storage units such as optical disks, flash drives, or any number of other hardware devices. The non-transitory, machine-readable medium 1560 may include instructions to direct the processor 1552 to perform a specific sequence or flow of actions, for example, as described with respect to the flowchart(s) and block diagram(s) of operations and functionality depicted above. As used herein, the terms "machine-readable medium" and "computer-readable medium" are interchangeable.

Also in a specific example, the instructions 1582 on the processor 1552 (separately, or in combination with the instructions 1582 of the machine readable medium 1560) may configure execution or operation of a trusted execution environment (TEE) 1590. In an example, the TEE 1590 operates as a protected area accessible to the processor 1552 for secure execution of instructions and secure access to data. Various implementations of the TEE 1590, and an accompanying secure area in the processor 1552 or the memory 1554 may be provided, for instance, through use of Intel® Software Guard Extensions (SGX) or ARM® Trust-Zone® hardware security extensions, Intel® Management Engine (ME), or Intel® Converged Security Manageability Engine (CSME). Other aspects of security hardening, hardware roots-of-trust, and trusted or protected operations may be implemented in the device 1550 through the TEE 1590 and the processor 1552.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., Hypertext Transfer Protocol (HTTP)).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

The machine executable instructions 1300 (1482) of FIG. 13 may be stored in the memory 1554, the storage 1558, and/or on a removable non-transitory computer readable storage medium such as a CD or DVD.

From the foregoing, it will be appreciated that example methods, apparatus and articles of manufacture have been disclosed herein to manage quality of service with respect to service level agreements in a computing device. Disclosed methods, apparatus and articles of manufacture improve the efficiency of a computer by allowing applications to be platform-agnostic. In this manner, an application does not need to include platform (e.g., OS or hardware) specific code, thereby reducing the size and complexity of applications. Accordingly, less resources are needed to deploy applications. Additionally, examples disclosed herein facilitate QoS functionality to ensure that SLA/SLO requirements are met with respect to pooled resources. Accordingly, disclosed methods, apparatus and articles of manufacture are directed to one or more improvement(s) in the functioning of a computer.

Example methods, apparatus, systems, and articles of manufacture to manage quality of service with respect to service level agreements in a computing device are disclosed herein. Further examples and combinations thereof include the following: Example 1 includes an apparatus (e.g., an edge computing device) to facilitate a service level agreement, the apparatus including a first mesh proxy assigned to a first platform-agnostic application, the first mesh proxy to generate a first resource request signal based on a first service level agreement requirement from the first platform-agnostic application, a second mesh proxy assigned to a second platform-agnostic application, the second mesh proxy to generate a second resource request signal based on a second service level agreement requirement from the second platform-agnostic application, and a load balancer to allocate hardware resources (e.g., processor resources, memory, hardware accelerators, etc.) for the first platform-agnostic application and the second platform-agnostic application based on the first resource request signal and the second resource request signal.

Example 2 includes the apparatus of example 1, further including a third mesh proxy assigned to a third platform-agnostic application, a hierarchy generator to generate a hierarchy for the first platform-agnostic application, the second platform-agnostic application, and the third platform-agnostic application, and the load balancer to allocate the hardware resources for the first platform-agnostic application, the second platform-agnostic application, and the third platform-agnostic application based on the hierarchy.

Example 3 includes the apparatus of exampled 1-2, wherein a first group in the hierarchy receives a different number of resources than a second group in the hierarchy.

Example 4 includes the apparatus of examples 1-3, further including an interface to transmit a hardware resource allocation corresponding to the allocated hardware resources to an operating system.

Example 5 includes the apparatus of examples 1-4, wherein the load balancer is to determine compliance to the first service level agreement requirement based on telemetry data.

Example 6 includes the apparatus of example 1, wherein the first mesh proxy is to determine compliance to the first service level agreement requirement based on telemetry data.

Example 7 includes an apparatus (e.g., an edge computing device) to facilitate a service level agreement, the apparatus including memory, and processor circuitry to translate a service level requirement of a service request into resource-based attributes, determine if pooled resources (e.g., memory, processor resources, hardware accelerators, etc.) are capable of servicing the service request according to the resource-based attributes, determine capacity of the pooled resources, and transmit a response (e.g., a signal, a data signal or data packet) to indicate the capability and the capacity of the pooled resources.

Example 8 includes the apparatus of example 7, wherein the processor circuitry is to obtain the service request from a broker and transmit the response to the broker.

Example 9 includes the apparatus of examples 7-8, wherein the processor circuitry is to translate the service level requirement of the service request into the resource-based attributes to determine resources to satisfy the service level requirement.

Example 10 includes the apparatus of examples 7-9, wherein the processor circuitry is to transmit a negative response to indicate that the pooled resources are not capable of servicing the service request when the pooled resources are not capable of servicing the service request.

Example 11 includes the apparatus of examples 7-10, wherein the pooled resources include at least one of memory, processor resources, or accelerators.

Example 12 includes the apparatus of examples 7-11, wherein the processor circuitry is to interface with a device interconnect fabric switch to determine at least one of the capability or the capacity of the pooled resources.

Example 13 includes the apparatus of examples 7-12, wherein the processor circuitry is implemented in at least one of an edge device, a server, or a virtual machine.

Example 14 includes a non-transitory computer readable storage medium comprising instructions which, when executed, cause one or more processors to at least generate a first resource request signal based on a first service level agreement requirement from a first platform-agnostic application, generate a second resource request signal based on a second service level agreement requirement from a second platform-agnostic application, and allocate hardware resources for the first platform-agnostic application and the second platform-agnostic application based on the first resource request signal and the second resource request signal.

Example 15 includes the computer readable storage medium of example 14, wherein the instructions cause the one or more processors to generate a hierarchy for the first platform-agnostic application, the second platform-agnostic application, and a third platform-agnostic application, and allocate the hardware resources for the first platform-agnostic application, the second platform-agnostic application, and the third platform-agnostic application based on the hierarchy.

Example 16 includes the computer readable storage medium of examples 14-15, wherein a first group in the hierarchy receives a different number of resources than a second group in the hierarchy.

Example 17 includes the computer readable storage medium of examples 14-16, wherein the instructions cause the one or more processors to transmit a hardware resource allocation corresponding to the allocated hardware resources to an operating system.

Example 18 includes the computer readable storage medium of examples 14-17, wherein the instructions cause the one or more processors to determine compliance to the first service level agreement requirement based on telemetry data.

Example 19 includes a non-transitory computer readable storage medium comprising instructions which, when executed, cause one or more processors to at least translate a service level requirement of a service request into resource-based attributes, determine if pooled resources are capable of servicing the service request according to the resource-based attributes, determine capacity of the pooled resources, and transmit a response to indicate the capability and the capacity of the pooled resources.

Example 20 includes the computer readable storage medium of example 19, wherein the instructions cause the one or more processors to obtain the service request from a broker and transmit the response to the broker.

Example 21 includes the computer readable storage medium of examples 19-20, wherein the instructions cause the one or more processors to translate the service level requirement of the service request into the resource-based attributes to determine resources to satisfy the service level requirement.

Example 22 includes the computer readable storage medium of examples 19-21, wherein the instructions cause the one or more processors to transmit a negative response to indicate that the pooled resources are not capable of servicing the service request when the pooled resources are not capable of servicing the service request.

Example 23 includes the computer readable storage medium of examples 19-22, wherein the pooled resources include at least one of memory, processor resources, or accelerators.

Example 24 includes the computer readable storage medium of examples 19-23, wherein the instructions cause the one or more processors to interface with a device interconnect fabric switch to determine at least one of the capability or the capacity of the pooled resources.

Example 25 includes the computer readable storage medium of examples 19-24, wherein the one or more processors is implemented in at least one of an edge device, a server, or a virtual machine.

Example 26 includes a method to facilitate a service level agreement, the method including generating, by executing an instruction with one or more processors, a first resource request signal based on a first service level agreement requirement from a first platform-agnostic application, generating, by executing an instruction with the one or more processors, a second resource request signal based on a second service level agreement requirement from a second platform-agnostic application, and allocating, by executing an instruction with the one or more processors, hardware resources for the first platform-agnostic application and the second platform-agnostic application based on the first resource request signal and the second resource request signal.

Example 27 includes the method of example 26, further including generating a hierarchy for the first platform-agnostic application, the second platform-agnostic application, and a third platform-agnostic application, and allocating the hardware resources for the first platform-agnostic application, the second platform-agnostic application, and the third platform-agnostic application based on the hierarchy.

Example 28 includes the method of examples 26-27, wherein a first group in the hierarchy receives a different number of resources than a second group in the hierarchy.

Example 29 includes the method of examples 26-28, further including transmitting a hardware resource allocation corresponding to the allocated hardware resources to an operating system.

Example 30 includes the method of examples 26-29, further including determining compliance to the first service level agreement requirement based on telemetry data.

Example 31 includes a method to facilitate a service level agreement, the method including translating, by executing an instruction with one or more processors, a service level requirement of a service request into resource-based attributes, determining, by executing an instruction with the one or more processors, if pooled resources are capable of servicing the service request according to the resource-based attributes, determining, by executing an instruction with the one or more processors, capacity of the pooled resources, and transmit a response to indicate the capability and the capacity of the pooled resources.

Example 32 includes the method of example 31, further including obtaining the service request from a broker and transmitting the response to the broker.

Example 33 includes the method of examples 31-32, further including translating the service level requirement of the service request into the resource-based attributes to determine resources to satisfy the service level requirement.

Example 34 includes the method of examples 31-33, further including transmitting a negative response to indicate that the pooled resources are not capable of servicing the service request when the pooled resources are not capable of servicing the service request.

Example 35 includes the method of examples 31-24, wherein the pooled resources include at least one of memory, processor resources, or accelerators.

Example 36 includes the method of examples 31-35, further including interfacing with a device interconnect fabric switch to determine at least one of the capability or the capacity of the pooled resources.

Example 37 includes the method of examples 31-36, wherein the one or more processors is implemented in at least one of an edge device, a server, or a virtual machine.

Example 28 is an edge computing device comprising processing circuitry to perform any of examples 26-37.

Example 29 is a computer-readable medium comprising instructions to perform any of examples 26-37.

Example 30 is an apparatus comprising means for performing any of examples 26-37.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to facilitate a service level agreement, the apparatus including:
   a first mesh proxy assigned to a first platform-agnostic application, the first mesh proxy to generate a first resource request signal based on a first service level agreement requirement from the first platform-agnostic application;
   a second mesh proxy assigned to a second platform-agnostic application, the second mesh proxy to generate a second resource request signal based on a second service level agreement requirement from the second platform-agnostic application; and
   a load balancer to allocate hardware resources for the first platform-agnostic application and the second platform-agnostic application based on the first resource request signal and the second resource request signal, at least one of the first mesh proxy, the second mesh proxy, or the load balancer including circuitry.

2. The apparatus of claim 1, further including:
a third mesh proxy assigned to a third platform-agnostic application;
a hierarchy generator to generate a hierarchy for the first platform-agnostic application, the second platform-agnostic application, and the third platform-agnostic application; and
the load balancer to allocate the hardware resources for the first platform-agnostic application, the second platform-agnostic application, and the third platform-agnostic application based on the hierarchy.

3. The apparatus of claim 2, wherein a first group in the hierarchy receives a different number of resources than a second group in the hierarchy.

4. The apparatus of claim 1, further including an interface to transmit a hardware resource allocation corresponding to the allocated hardware resources to an operating system.

5. The apparatus of claim 1, wherein the load balancer is to determine compliance to the first service level agreement requirement based on telemetry data.

6. The apparatus of claim 1, wherein the first mesh proxy is to determine compliance to the first service level agreement requirement based on telemetry data.

7. At least one non-transitory computer readable storage medium comprising instructions to cause at least one processor circuit to at least:
generate a first resource request signal based on a first service level agreement requirement from a first platform-agnostic application;
generate a second resource request signal based on a second service level agreement requirement from a second platform-agnostic application; and
allocate hardware resources for the first platform-agnostic application and the second platform-agnostic application based on the first resource request signal and the second resource request signal.

8. The at least one computer readable storage medium of claim 7, wherein the instructions are to cause one or more of the at least one processor circuit to:
generate a hierarchy for the first platform-agnostic application, the second platform-agnostic application, and a third platform-agnostic application; and
allocate the hardware resources for the first platform-agnostic application, the second platform-agnostic application, and the third platform-agnostic application based on the hierarchy.

9. The at least one computer readable storage medium of claim 8, wherein a first group in the hierarchy receives a different number of resources than a second group in the hierarchy.

10. The at least one computer readable storage medium of claim 7, wherein the instructions are to cause one or more of the at least one processor circuit to transmit a hardware resource allocation corresponding to the allocated hardware resources to an operating system.

11. The at least one computer readable storage medium of claim 7, wherein the instructions are to cause one or more of the at least one processor circuit to determine compliance to the first service level agreement requirement based on telemetry data.

12. An apparatus to facilitate a service level agreement, the apparatus comprising:
memory;
computer readable instructions; and
at least one processor circuit to be programmed by the computer readable instructions to:
generate a first resource request signal based on a first service level agreement requirement from a first platform-agnostic application;
generate a second resource request signal based on a second service level agreement requirement from a second platform-agnostic application; and
allocate hardware resources for the first platform-agnostic application and the second platform-agnostic application based on the first resource request signal and the second resource request signal.

13. The apparatus of claim 12, wherein one or more of the at least one processor circuit is to:
generate a hierarchy for the first platform-agnostic application, the second platform-agnostic application, and a third platform-agnostic application; and
allocate the hardware resources for the first platform-agnostic application, the second platform-agnostic application, and the third platform-agnostic application based on the hierarchy.

14. The apparatus of claim 13, wherein a first group in the hierarchy receives a different number of resources than a second group in the hierarchy.

15. The apparatus of claim 12, wherein one or more of the at least one processor circuit is to transmit a hardware resource allocation corresponding to the allocated hardware resources to an operating system.

16. The apparatus of claim 12, wherein one or more of the at least one processor circuit is to determine compliance to the first service level agreement requirement based on telemetry data.

17. A method comprising:
generating, by executing an instruction with programmable circuitry, a first resource request signal based on a first service level agreement requirement from a first platform-agnostic application;
generating, by executing an instruction with the programmable circuitry, a second resource request signal based on a second service level agreement requirement from a second platform-agnostic application; and
allocating, by executing an instruction with the programmable circuitry, hardware resources for the first platform-agnostic application and the second platform-agnostic application based on the first resource request signal and the second resource request signal.

18. The method of claim 17, further including:
generating a hierarchy for the first platform-agnostic application, the second platform-agnostic application, and a third platform-agnostic application; and
allocating the hardware resources for the first platform-agnostic application, the second platform-agnostic application, and the third platform-agnostic application based on the hierarchy.

19. The method of claim 18, wherein a first group in the hierarchy receives a different number of resources than a second group in the hierarchy.

20. The method of claim 17, further including transmitting a hardware resource allocation corresponding to the allocated hardware resources to an operating system.

21. The method of claim 17, further including determining compliance to the first service level agreement requirement based on telemetry data.

* * * * *